United States Patent
Lin et al.

(10) Patent No.: US 10,578,328 B2
(45) Date of Patent: Mar. 3, 2020

(54) SYSTEMS AND METHODS FOR DETECTING DEGRADATION OF A COMPONENT IN AN AIR CONDITIONING SYSTEM

(71) Applicant: Liebert Corporation, Columbus, OH (US)

(72) Inventors: Zhiyong Lin, Dublin, OH (US); Martin Hrncar, Trencin (SK)

(73) Assignee: Vertiv Corporation, Columbus, OH (US)

( * ) Notice: Subject to any disclaimer, the term of this patent is extended or adjusted under 35 U.S.C. 154(b) by 348 days.

(21) Appl. No.: 15/410,144

(22) Filed: Jan. 19, 2017

(65) Prior Publication Data

US 2017/0234561 A1  Aug. 17, 2017

Related U.S. Application Data

(60) Provisional application No. 62/293,798, filed on Feb. 11, 2016.

(51) Int. Cl.
*F24F 11/30* (2018.01)
*F25B 49/02* (2006.01)
(Continued)

(52) U.S. Cl.
CPC .......... *F24F 11/30* (2018.01); *F25B 1/10* (2013.01); *F25B 41/04* (2013.01); *F25B 41/043* (2013.01);
(Continued)

(58) Field of Classification Search
CPC . F24F 11/30; F24F 11/32; F25B 49/02; F25B 41/043; F25B 41/04; F25B 1/10;
(Continued)

(56) References Cited

U.S. PATENT DOCUMENTS

| 4,271,678 A | 6/1981 | Liebert |
| 6,658,373 B2 | 12/2003 | Rossi et al. |

(Continued)

FOREIGN PATENT DOCUMENTS

| CA | 2344908 C | 6/2010 |
| WO | WO-2007018530 A1 | 2/2007 |
| WO | WO-2013119489 A2 | 8/2013 |

OTHER PUBLICATIONS

Liebert DSE Precision Cooling System (Liebert Corporation, copyright 2011, <http://www.wardboland.com/downloads/LiebertDSE-Brochure(SL-18927).pdf>retrieved on Jul. 24, 2019 (Year: 2011).*

(Continued)

*Primary Examiner* — Alexander Satanovsky
*Assistant Examiner* — Mark I Crohn
(74) *Attorney, Agent, or Firm* — Harness, Dickey & Pierce, P.L.C.

(57) ABSTRACT

A method including: determining whether a cooling system is operating in a cooling mode, such that the cooling system is not operating in a reheat mode, a humidification mode or a dehumidification mode; determining whether the cooling system is operating in a compressor mode, such that the cooling system is not operating in a pump refrigerant economization mode; determining whether the cooling system is at steady-state; and if the cooling system is operating in the cooling mode and the compressor mode and is at steady-state, evaluating one or more rules to determine if a degradation symptom exists for the cooling system. The method further includes: subsequent to the evaluation, generating a degradation evaluation value to indicate whether the one or more rules are satisfied; and based on the degradation evaluation value, generating an alarm signal or performing a countermeasure.

26 Claims, 11 Drawing Sheets

(51) Int. Cl.
*G05B 23/02* (2006.01)
*F25B 41/04* (2006.01)
*F25B 1/10* (2006.01)
*F24F 11/32* (2018.01)

(52) U.S. Cl.
CPC .......... *F25B 49/02* (2013.01); *G05B 23/0245* (2013.01); *F24F 11/32* (2018.01); *F25B 2400/06* (2013.01); *F25B 2500/06* (2013.01); *F25B 2500/22* (2013.01); *F25B 2600/02* (2013.01); *F25B 2600/11* (2013.01); *F25B 2600/13* (2013.01); *F25B 2600/21* (2013.01); *F25B 2700/195* (2013.01); *F25B 2700/1931* (2013.01); *F25B 2700/1933* (2013.01); *F25B 2700/2106* (2013.01); *F25B 2700/21151* (2013.01); *F25B 2700/21152* (2013.01); *Y02B 30/745* (2013.01)

(58) Field of Classification Search
CPC .............. F25B 2600/02; F25B 2600/21; F25B 2600/13; F25B 2600/11; F25B 2500/06; F25B 2400/06; F25B 2500/22; F25B 2700/21151; F25B 2700/2106; F25B 2700/195; F25B 2700/1933; F25B 2700/1931; F25B 2700/21152; G05B 23/0245; Y02B 30/745
See application file for complete search history.

(56) References Cited

U.S. PATENT DOCUMENTS

| | | | |
|---|---|---|---|
| 7,188,482 B2 | 3/2007 | Sadegh et al. | |
| 7,444,251 B2 | 10/2008 | Nikovski et al. | |
| 7,594,407 B2 | 9/2009 | Singh et al. | |
| 7,631,508 B2 | 12/2009 | Braun et al. | |
| 7,752,853 B2 | 7/2010 | Singh et al. | |
| 8,973,380 B2 | 3/2015 | Bean, Jr. et al. | |
| 2005/0126190 A1 | 6/2005 | Lifson et al. | |
| 2009/0044550 A1 | 2/2009 | Nishimura et al. | |
| 2011/0112814 A1 | 5/2011 | Clark | |
| 2012/0072029 A1* | 3/2012 | Persaud | G05B 23/0235 700/276 |
| 2012/0166151 A1 | 6/2012 | Fisera et al. | |
| 2012/0318011 A1 | 12/2012 | Ochiai et al. | |
| 2013/0067942 A1 | 3/2013 | Ochiai et al. | |
| 2018/0373822 A1* | 12/2018 | Poux | F25B 49/02 |

OTHER PUBLICATIONS

Braun, James E.; "Automated Fault Detection and Diagnostics for Vapor Compression Cooling Equipment"; Ray W. Herrick Laboratories; Purdue University; Online Aug. 4, 2003; 10 pages.

Kim, Minsung et al.; "Cooling Mode Fault Detection and Diagnosis Method for a Residential Heat Pump"; NIST Special Publication 1087; Oct. 2008; 98 pages.

"Demonstrating Automated Fault Detection and Diagnosis Methods in Real Buildings"; International Energy Agency; Energy Conservation in Buildings and Community Systems; Annex 34; VTT Technical Research Centre of Finland; Aug. 2001; 400 pages.

Breuker, Mark S. et al.; "Demonstration of a Statistical, Rule-Based Fault Detection and Diagnostic Method on a Rooftop Air Conditioning Unit"; Ray W. Herrick Laboratories, Purdue University; 1997; 21 pages.

Hrncar, Martin et al.; "Performance Monitoring Strategies for Effective Running of Commercial Refrigeration Systems." Proceedings of the 12th WSEAS International Conference on Automatic Control, Modelling & Simulation. World Scientific and Engineering Academy and Society (WSEAS); 2010; pp. 177-180.

Chen, B. et al.; "Simple Fault Detection and Diagnosis Methods for Packaged Air Conditioners"; Purdue University, Purdue e-Pubs; International Refrigeration and Air Conditioning Conference; School of Mechanical Engineering; Jul. 25-28, 2000; 9 pages.

International Search Report and Written Opinion for PCT Application No. PCT/US2017/017001 dated Apr. 24, 2017; 15 pages.

Liebert® iCOM®, User Manual—Intelligent Communications & Monitoring for Liebert DSE™ with Software Version PA2.03.031R, SL-18932_REV0_01-14, © 2014 Liebert Corporation, 188 pages.

Liebert® EconoPhase™, User Manual—85kW (24 Tons),125kW (35 Tons), 50Hz and 60Hz, SL-18920_REV4_11-15, © 2014 Liebert Corporation, 36 pages.

Liebert® DSE™,User Manual—Downflow, 80-150kW, 23-43 Tons; Upflow, 80-85kW, 23-24 Tons; 50/60Hz, SL-18925_REV6_09-14, © 2014 Liebert Corporation, 132 pages.

Liebert® DSE™, User Manual Supplement—165kW, 47 Tons, Downflow, 60Hz, SL-18931_REV1_03-14, © 2014 Liebert Corporation, 28 pages.

* cited by examiner

SYSTEMS AND METHODS FOR DETECTING DEGRADATION OF A COMPONENT IN AN AIR CONDITIONING SYSTEM

CROSS-REFERENCE TO RELATED APPLICATIONS

This application claims the benefit of U.S. Provisional Application No. 62/293,798, filed on Feb. 11, 2016. The entire disclosure of the application referenced above is incorporated herein by reference.

FIELD

The present disclosure relates to cooling systems, and more particularly, to detection of component degradation within a cooling system.

BACKGROUND

This section provides background information related to the present disclosure which is not necessarily prior art.

Cooling systems are utilized for air conditioning as well as for refrigeration of food products. Variations in performance and/or breakdown of the cooling systems can negatively affect health and comfort of humans, safety of food products and/or profitability of a business. Cooling systems have applicability in a number of different applications where a fluid is to be cooled. The fluid may be a gas, such as air, or a liquid, such as water. Example applications are heating, ventilation, air conditioning (HVAC) systems that are used for cooling spaces where people are present such as offices and data center climate control systems. A data center may refer to a room having a collection of electronic equipment, such as computer servers.

In FIG. 1, an air conditioner 50 that may be used in, for example, a computer room is shown. The air conditioner 50 includes a cooling circuit 51 and a cabinet 52. The cooling circuit 51 is disposed in the cabinet 52 and includes an evaporator 54, an air moving device 56, a compressor 58, a condenser 60, and an expansion valve 62. The evaporator 54, compressor 58, condenser 60 and expansion valve 62 are connected in a closed loop in which a cooling fluid (e.g., phase change refrigerant) circulates. The evaporator 54 may include a V-coil assembly with multiple cooling slabs to provide increased cooling capacity. The evaporator 54 receives the cooling fluid and cools air passing through openings in evaporator 54. The air moving device 56 (e.g., a fan or squirrel cage blower) draws the air from an inlet (not shown) in the cabinet 52 and through the evaporator 54. The cooled air is directed from the evaporator 54 and out a plenum 64 in the cabinet 52.

The compressor 58 circulates the cooling fluid through the condenser 60, the expansion valve 62, and the evaporator 54 and back to the compressor 58. The cooling fluid is received at an inlet of the compressor compressed and discharged at a center (or outlet) towards the condenser 60. The condenser 60 cools the cooling fluid received from the compressor 58. The expansion valve 62 may be an electronic expansion valve and expand the cooling fluid out of the condenser 60 from, for example, a liquid to a vapor.

A position of the expansion valve 62 (or opening percentage of the expansion valve) may be adjusted to control a suction superheat value of the compressor 58. The suction superheat value of the compressor is equal to a compressor suction temperature minus a compressor saturated suction temperature. A compressor suction pressure may be used to determine the compressor saturated suction temperature. The compressor suction temperature and the compressor suction pressure may be determined based on signals from corresponding sensors connected between the evaporator 54 and the compressor 58. The superheat value refers to an amount that a temperature of a cooling fluid, in a gas state, is heated above the compressor saturated suction temperature.

The superheat value can be used to modulate (or adjust) position of the expansion valve 62. Position (or opening percentage) control of the expansion valve 62 may be performed by a proportional, integral, derivative (PID) control module. The PID control module controls the superheat value to match a constant predetermined superheat setpoint. This ensures compressor reliability and improves compressor efficiency.

Components of air conditioning systems can degrade over time. The degradation can result in refrigerant leakage, fouling of a condenser coil, clogging of a filter dryer and/or an air filter, compressor wear, etc. A refrigerant leak can damage a compressor and/or be harmful to an environment. The degradation of the components can cause inefficient system operation and/or downtime if one or more of the components fail.

SUMMARY

This section provides a general summary of the disclosure, and is not a comprehensive disclosure of its full scope or all of its features.

In an aspect, a method is provided and includes: determining whether a cooling system is operating in a cooling mode, such that the cooling system is not operating in a reheat mode, a humidification mode or a dehumidification mode; determining whether the cooling system is operating in a compressor mode, such that the cooling system is not operating in a pump refrigerant economization mode; determining whether the cooling system is at steady-state; and if the cooling system is operating in the cooling mode and the compressor mode and is at steady-state, evaluating one or more rules to determine if a degradation symptom exists for the cooling system. The method further includes: subsequent to the evaluation, generating a degradation evaluation value to indicate whether the one or more rules are satisfied; and based on the degradation evaluation value, generating an alarm signal or performing a countermeasure.

In another aspect, a method is provided and includes: determining whether a cooling system is operating in a cooling mode, such that the cooling system is not operating in a reheat mode, a humidification mode or a dehumidification mode; determining whether the cooling system is operating in a compressor mode, such that the cooling system is not operating in a pump refrigerant economization mode; determining whether parameters are in a predefined operational space; determining whether the cooling system is at steady-state; and determining an average of qualified values of a first parameter of the cooling system if the parameters are in the predefined operational space and the cooling system is operating in the cooling mode and the compressor mode and is at steady-state, where the parameters do not include the first parameter. The method further includes: based on the average of qualified values, determining whether a predefined criterion is satisfied for a degradation symptom of the cooling system; generating a degradation evaluation value to indicate whether the predefined criterion is satisfied; and based on the degradation evaluation value, generating an alarm signal or performing a countermeasure.

In yet another aspect, a method includes: evaluating one or more rules to determine if a degradation symptom exists for a cooling system; subsequent to the evaluation, generating a first degradation evaluation value to indicate whether the one or more rules are satisfied; determining an average of qualified values of a first parameter of the cooling system; based on the average, determining whether a predefined criterion is satisfied; and generating a second degradation evaluation value to indicate whether the predefined criterion is satisfied. The method further includes: determining a final symptom detection value based on the first degradation evaluation value and the second degradation evaluation value; determining a symptom occurrence ratio based on the final symptom detection value; adjusting a fault relevancy value based on the symptom occurrence ratio; and based on the fault relevancy value, generating an alarm signal or performing a countermeasure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected implementations and not all possible implementations, and are not intended to limit the scope of the present disclosure.

Corresponding reference numerals indicate corresponding parts throughout the several views of the drawings.

DETAILED DESCRIPTION

Example implementations will now be described more fully with reference to the accompanying drawings.

To improve efficiency and reduce downtime, examples of fault detection systems and methods are disclosed herein for monitoring and maintaining operation of cooling systems at expected levels. This includes detecting degradation of one or more components within a cooling system (e.g., an air conditioning system). Degradation may be detected early on allowing for maintenance and/or countermeasures to be performed prior to component failure. The examples minimize false alarms and provide reliable detection of degradation. The examples are applicable to various different types and models of cooling systems and are not restricted to specific thresholds for specific types and/or models of air conditioning systems. One or more of the examples provide the stated detection without need of a server for storing large amounts of historical data. The detection may be provided by a single controller (or control module) without need of a server.

The disclosed methods include a rule based method and a distance based method. The rule based method includes monitoring and evaluating selected operating parameters (variables) of cooling systems to determine if the operating parameters satisfy predetermined rules. The rules describe typical symptoms of cooling systems when operating with a degraded component and/or in a degraded state (e.g., a low refrigerant charge state).

Figure 1:
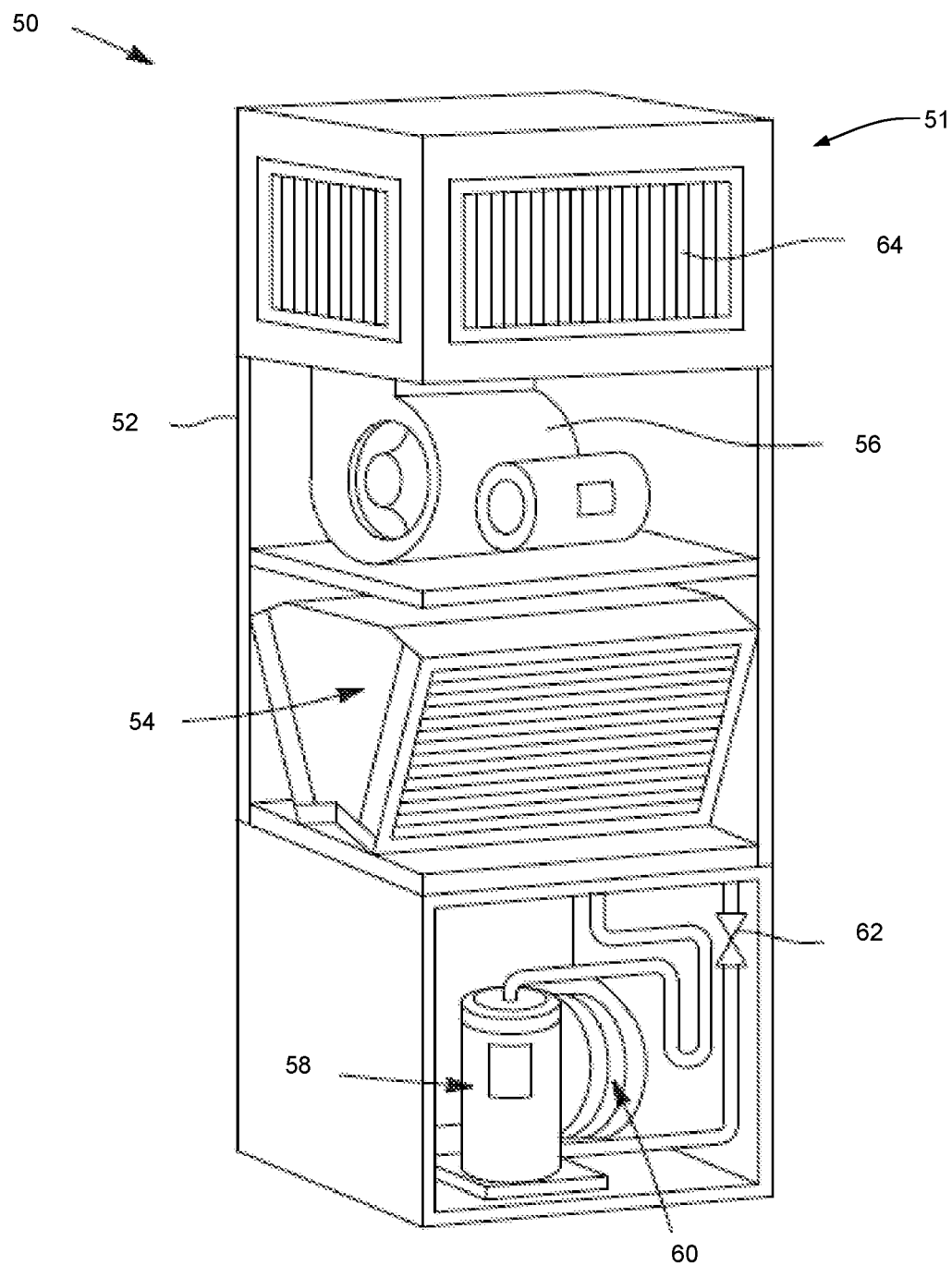
FIG. 1 is a perspective view of a prior art air conditioner.
Figure 2:
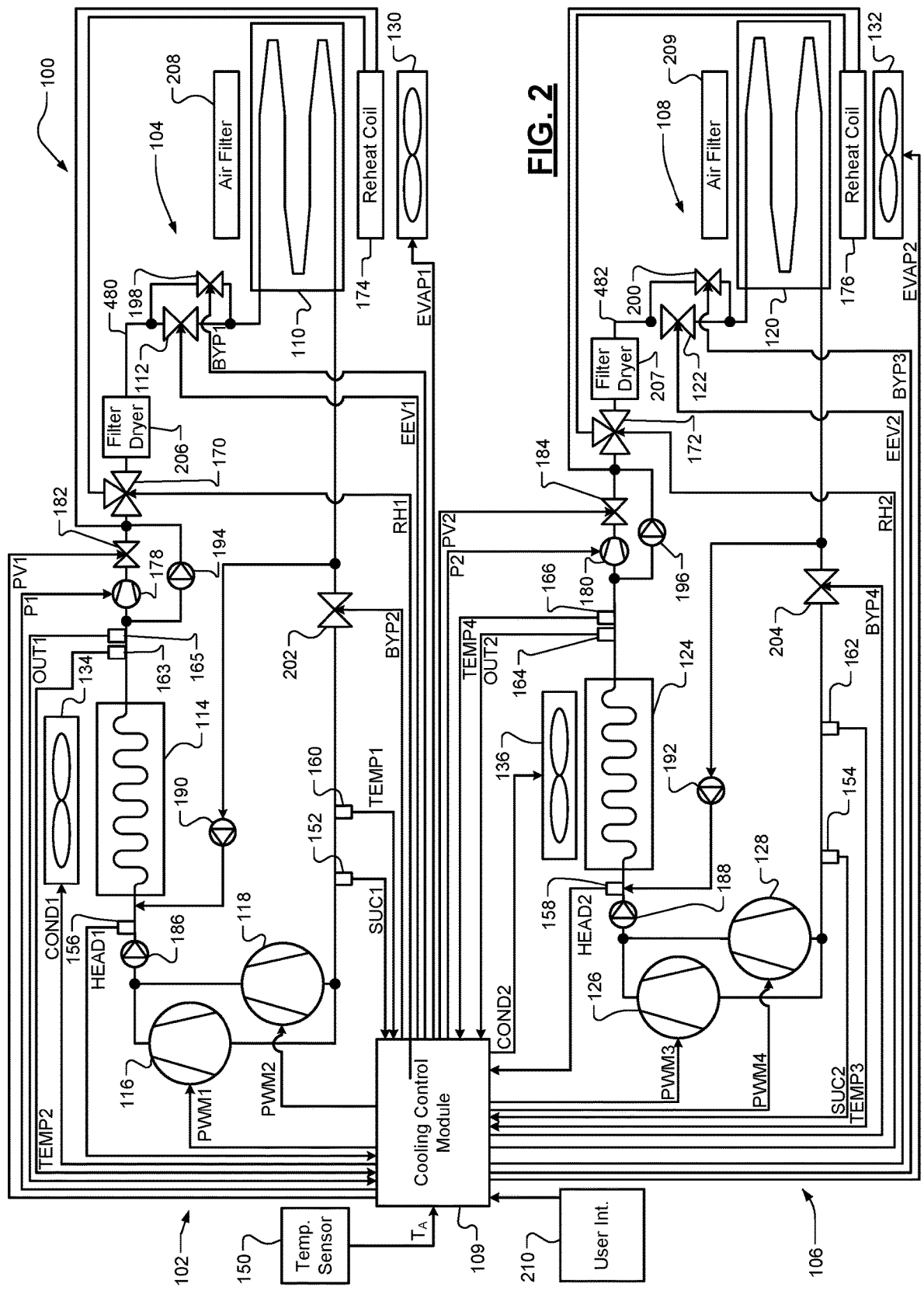
FIG. 2 is a schematic view of a multi-stage cooling system incorporating a cooling control module in accordance with an aspect of the present disclosure.

FIG. 2 shows an example of a cooling system 100. The cooling system 100 includes an upstream cooling stage 102 with an upstream (or first) cooling circuit 104 and a downstream (or second) cooling stage 106 with a downstream cooling circuit 108. The cooling circuits 104, 108 are controlled via a cooling control module 109 (may be referred to as a "controller"). Although two cooling circuits are shown, a different number of cooling circuits may be included. The upstream cooling circuit 104 includes a first evaporator 110, a first expansion valve 112, a first condenser 114, a first compressor 116, and a second compressor 118. The downstream cooling circuit 108 includes a second evaporator 120, a second expansion valve 122, a second condenser 124, a third compressor 126, and a fourth compressor 128. The evaporators 110, 120 have respective evaporator fans 130, 132. The condensers 114, 124 have respective condenser fans 134, 136.

The controller 109 may generate condenser fan signals COND1, COND2, evaporator fan signals EVAP1, EVAP2, expansion valve signals EEV1, EEV2, and compressor signals PWM1, PWM2, PWM3, PWM4 to control the fans 130, 132, 134, 136, expansion valves 112, 122, and the compressors 116, 118, 126, 128. The controller 109 may control the fans 130, 132, 134, 136, the expansion valves 112, 122, and/or the compressors 116, 118, 126, 128 based on signals from various sensors. The sensors may include, for example, an ambient temperature sensor 150, suction pressure sensors 152, 154, head pressure sensors 156, 158 compressor inlet (or evaporator outlet) temperature sensors 160, 162 and/or other sensors disclosed herein. The ambient temperature sensor 150 may be an outdoor ambient temperature sensor and generate an ambient temperature signal $T_A$. The suction pressure sensors 152, 154 generate suction pressure signals SUC1, SUC2 and detect pressures of fluid received by the compressors 116, 118, 126, 128. The head pressure sensors 156, 158 generate head pressure (or discharge pressure) signals HEAD1, HEAD2 and detect pressures of fluid out of the compressors 116, 118, 126, 128. The temperature sensors 160, 162 detect temperatures of fluids (i) downstream from the evaporators 110, 120, and (ii) between the evaporators 110, 120 and the compressors 116, 118, 126, 128. Other temperature sensors 163, 164 and pressure sensors 165, 166 may also be included. The temperature sensors 163, 164 may generate temperature signals TEMP2, TEMP3 and indicate temperatures of cooling fluid out of the condensers 114, 124. The pressure sensors 165, 166 may generate pressure signals OUT1, OUT2 and indicate pressures of the cooling fluid out of the condensers 114, 124.

The evaporators 110, 120 may be micro-channel (MC) cooling coil assemblies and/or include a MC heat exchanger and/or may be fin-and-tube cooling coil assemblies. The expansion valves 112, 122 may be mechanical and/or electronic based expansion valves (e.g., EEVs) and/or thermostatic expansion valves. Each of the condensers 114, 124 may be of a variety of types, such as an air-cooled condenser, a water-cooled condenser, or glycol cooled condenser. The condensers 114, 124 may include heat rejection devices that transfer heat from return fluids to a cooler medium, such as outside air. The heat rejection devices may include air or liquid cooled heat exchangers.

In each of the circuits 104, 108, a cooling fluid (or refrigerant) is circulated by a respective pair of the compressors 116, 118, 126, 128. The fluids flow from the compressors 116, 118, 126, 128, through the condensers 114, 124, expansion valves 112, 122, and evaporators 110, 120 and back to the compressors 116, 118, 126, 128. The evaporators 110, 120 may be arranged in stages such that air flows in a serial fashion first through the upstream evaporator 110 and then through the downstream evaporator 120. By having multiple cooling stages arranged for serial air flow, a temperature differential across the evaporators 110, 120 is reduced. This in turn allows the evaporators 110, 120 to operate at different pressure levels and allows the pressure differences between the respective evaporators 110, 120 and condensers 114, 124 to be reduced.

Since compressor power is a function of a pressure difference between an evaporator and a condenser, a lower pressure difference is more energy efficient. Each of the cooling circuits 104, 108 may include one or more compressors (e.g., compressors 116, 118 or compressors 126, 128). Each of the compressors may be a fixed capacity scroll compressor (e.g., compressors 116, 126) or a variable capacity scroll compressor (e.g., compressors 118, 128). The fixed capacity scroll compressors may be activated (powered ON) and deactivated (powered OFF) based on control signals generated by the controller 109. The variable capacity scroll compressors may be controlled via a respective digital signal received from the controller 109.

Each of the cooling circuits 104, 108 may include a tandem set of compressors (e.g., first tandem set of compressors 116, 118 and second tandem set of compressors 126, 128). Each of the tandem sets may include two compressors of equal volumetric displacement. The first compressor may be a digital pulse width modulation (PWM) scroll compressor that receives a PWM percentage signal to control speed and capacity of the first compressor. The second compressor may be a fixed speed scroll compressor with simply ON/OFF capacity control. Suction and discharge lines of these two compressors may be piped in parallel to form the tandem set. As an example, compressors 116, 126 may be PWM scroll compressors and compressors 118, 128 may be fixed speed scroll compressors. The fixed speed scroll compressors may receive ON/OFF control signals rather than PWM signals from the controller 109.

The tandem set compressor configuration allows for energy efficient temperature control by providing a wide range of capacity modulation for a cooling circuit of an air conditioning system. The tandem sets offer an energy efficient configuration at compressor startup by allowing the digital PWM scroll compressors to be activated prior to the fixed speed scroll compressors. This effectively allows the tandem sets to provide partial-displacement operation with a reduced volumetric displacement/capacity until additional capacity is needed from the fixed scroll compressors.

As used herein, a compressor pressure differential refers to a difference between input and output pressures of the compressor. A low-pressure differential (e.g., less than a predetermined differential and/or suction and head pressures of the compressor are equal to each other) can cause an unloaded compressor condition. Compressor unloading can lead to reduced cooling capacity of the compressors of a tandem set at startup and potential damage to the tandem set and/or associated compressor motors. Unloading of the compressors reduces the ability of the tandem set to move vapor, which reduces cooling capacity. This reduction in the pressure differential can also cause damage to compressor motor(s) if the reduction occurs repeatedly.

Each of the cooling circuits 104, 108 may also include components for reheat operation including reheat valves 170, 172 and reheat coils 174, 176. The cooling control circuit may generate reheat signals RH1, RH2 to control states of the reheat valves 170, 172 to allow cooling fluid to pass through the reheat coils 174, 176.

Each of the cooling circuits 104, 108 may also include components for pump refrigerant economization (PRE) operation including pumps 178, 180, pump valves 182, 184, check valves 186, 188, 190, 192, 194, 196, bypass valves 198, 200, and/or shutoff valves 202, 204. The check valves 186, 188 are connected between corresponding ones of the compressors 116, 118, 126, 128 and the condensers 114, 124. The check valves 190, 192 are connected between corresponding ones of the evaporators 110, 120 and the condensers 114, 124. The check valves 194, 196 are connected across corresponding ones of the pumps 178, 180 and the pump valves 182, 184. The pumps 178, 180 may be variable speed pumps. The pumps 178, 180 and the pump valves 182, 184 are connected in series between the condensers 114, 124 and the (i) reheat valves 170, 172, and/or (ii) the evaporator valves 112, 122. The bypass valves 198, 200 are connected across the expansion valves 112, 122. The shutoff valves 202, 204 are connected between the evaporators 110, 120 and the compressors 116, 118, 126, 128.

During a PRE mode and when the pumps 178, 180 are variable speed pumps, cooling capacity of cooling circuits 104, 108 is controlled by the controller 109 by modulating the speeds of the pumps 178, 180. That is, to increase cooling capacity, controller 109 increases the speeds of the pumps 178, 180 to increase the rate of flow of refrigerant in the cooling circuits 104, 108 and to decrease cooling capacity, controller 109 decreases the speeds of the pumps 178, 180 to decrease the rate of flow or refrigerant in cooling circuits 104, 108. Refrigerant temperatures at inlets of the evaporators 110, 120 are maintained above freezing by the controller 109 modulating the speeds of condenser fans 134, 136. Minimum pump differentials are maintained by the controller 109 modulating the electronic expansion valves 112, 122. As an alternative, the pump differentials may be maintained by the controller 109 by controlling states of the bypass valves 198, 200 if the expansion valves 112, 122 are thermal expansion valves. A pump differential refers to a pressure differential across a pump. In this regard, when the pumps 178, 180 are variable speed pumps, the pumps 178, 180 may be hermetically sealed and cooled by refrigerant flowing through the pumps 178, 180 during pumping of the refrigerant. If the pumps 178, 180 are fixed speed pumps, cooling capacity of cooling circuits 104, 108 are controlled by the controller 109 modulating electronic expansion valves 112, 122 to increase or decrease the rate of flow of refrigerant in cooling circuits 104, 108.

During a compressor mode, the controller 109 controls the compressors 116, 118, 126 128, close the pump valves 182, 184, and turns OFF the pumps 178, 180. Since the compressor 116, 118, 126 128 are running, suction at inlets of the compressors 116, 118, 126, 128 draw vaporized refrigerant from outlets of the evaporators 110, 120 and into the compressors 116, 118, 126, 128, where the refrigerant is compressed by the compressors 116, 118, 126, 128 thereby raising pressures of the refrigerant. The suction at the inlets of the running compressors 116, 118, 126, 128 draws the refrigerant into the inlets. The refrigerant does not flow through the check valves 190, 192. The refrigerant then flows through check valves 186, 188 into condensers 114, 124 where it is cooled and condensed to a liquid state. Since the pump valves 182, 184 are closed and pumps 178, 180 are OFF, the refrigerant flows out of condensers 114, 124 and through check valves 194, 196, through expansion valves 112, 122, where pressures of the refrigerant are reduced. The refrigerant is then provided to the evaporators 110, 120. The refrigerant flows through the evaporators 110, 120, where the refrigerant is then heated to vaporization by air to be cooled flowing through evaporators 110, 120. The refrigerant then flows back to the inlets of the compressors 116, 118, 126, 128.

When controller 109 switches cooling circuits 104, 108 to the pumped refrigerant economizer mode, the pump valves 182, 184 are opened, the compressors 116, 118, 126, 128 are turned OFF, and the pumps 178, 180 are turned ON. Pumps 178, 180 then pump the refrigerant through the pump valves 182, 184, expansion valves 112, 122, evaporators 110, 120, check valves 190, 192 bypassing compressors 116, 118, 126, 128, through condensers 114, 124 and back to inlets of the pumps 178, 180. The controller 109 switches cooling circuits 104, 108 to the PRE mode when the ambient temperature of the outside air is cold enough to provide the requisite temperature differential between the inside air to be cooled and the outside air to which heat is rejected.

The shutoff valves 202, 204 are added at inlets of compressors 116, 118, 126, 128 and controlled by controller 109 to prevent liquid slugging to the compressors 116, 118, 126, 128. During the compressor mode, the controller 109 opens shutoff valves 202, 204. During the PRE mode, controller 109 closes the shutoff valves 202, 204 thus preventing refrigerant from flowing to inlets of the compressors 116, 118, 126, 128 and preventing liquid slugging of the compressors 116, 118, 126, 128. Bypass valves 198, 200 and a distributor (not shown) may be provided to reduce system pressure drop and distribute the refrigerant to the circuits of the evaporators 110, 120.

Although a certain number of components, devices, and circuits are shown, any number of the components, devices, and/or circuits may be included in the cooling system. For example, although two cooling circuits 104, 108 are shown, the cooling system 100 may include one or more circuits. Also, although certain components, devices and circuits are shown, any of the components, devices and/or circuits may not be included in the cooling system. For example, one or more of the valves 182, 184, pumps 178, 180, check valves 186, 188, 190, 192, 194, 196, bypass valves 198, 200, shutoff valves 202, 204, and/or any other component, device and/or circuit may not be included in the cooling system 100.

The cooling circuits 104, 108 may also include filter dryers 206, 207. The filter dryers 206, 207 may be connected between the reheat valves 170, 172 and the expansion valves 112, 122. The cooling circuits 104, 108 may further include air filters 208, 209, which may receive air passed through the evaporators 110, 120.

The cooling system 100 may include a user input device 210, such as a keyboard, a mouse, a touchscreen, etc. The user input device 210 may receive user inputs for adjusting operation of the controller 109. As an example the controller 109 may in response to a user input generate a reset signal, as is further described below.

Figure 3:
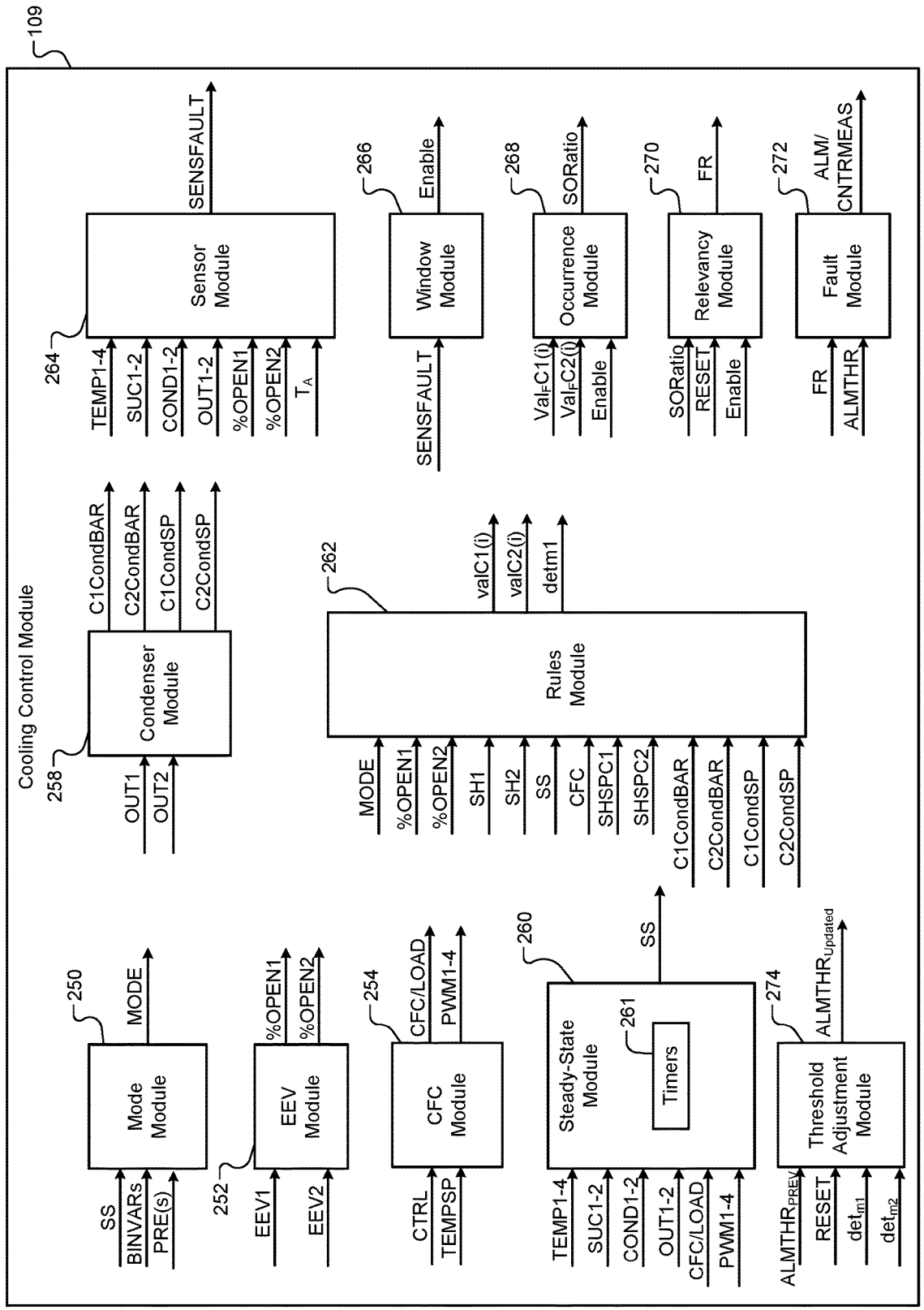
FIG. 3 is a functional block diagram of a portion of the cooling control module of FIG. 2 in accordance with an aspect of the present disclosure.

FIG. 3 shows a portion of the cooling control module 109. The cooling control module 109 may include a mode module 250, an electronic expansion valve (EEV) module 252, a call for cooling (CFC) module 254, a condenser module 258, a steady-state module 260, a rules module 262, a sensor module 264, a window module 266, an occurrence module 268, a relevancy module 270, a fault module 272 and/or a threshold adjustment module 274. The steady-state module 260 may include one or more timers 261 for determining whether parameters, averages of monitored parameter values, etc. have been monitored for predetermined periods of time. Operations of the modules of FIG. 3 are described below with respect to the methods of FIGS. 4, 6 and 9.

Figure 4:
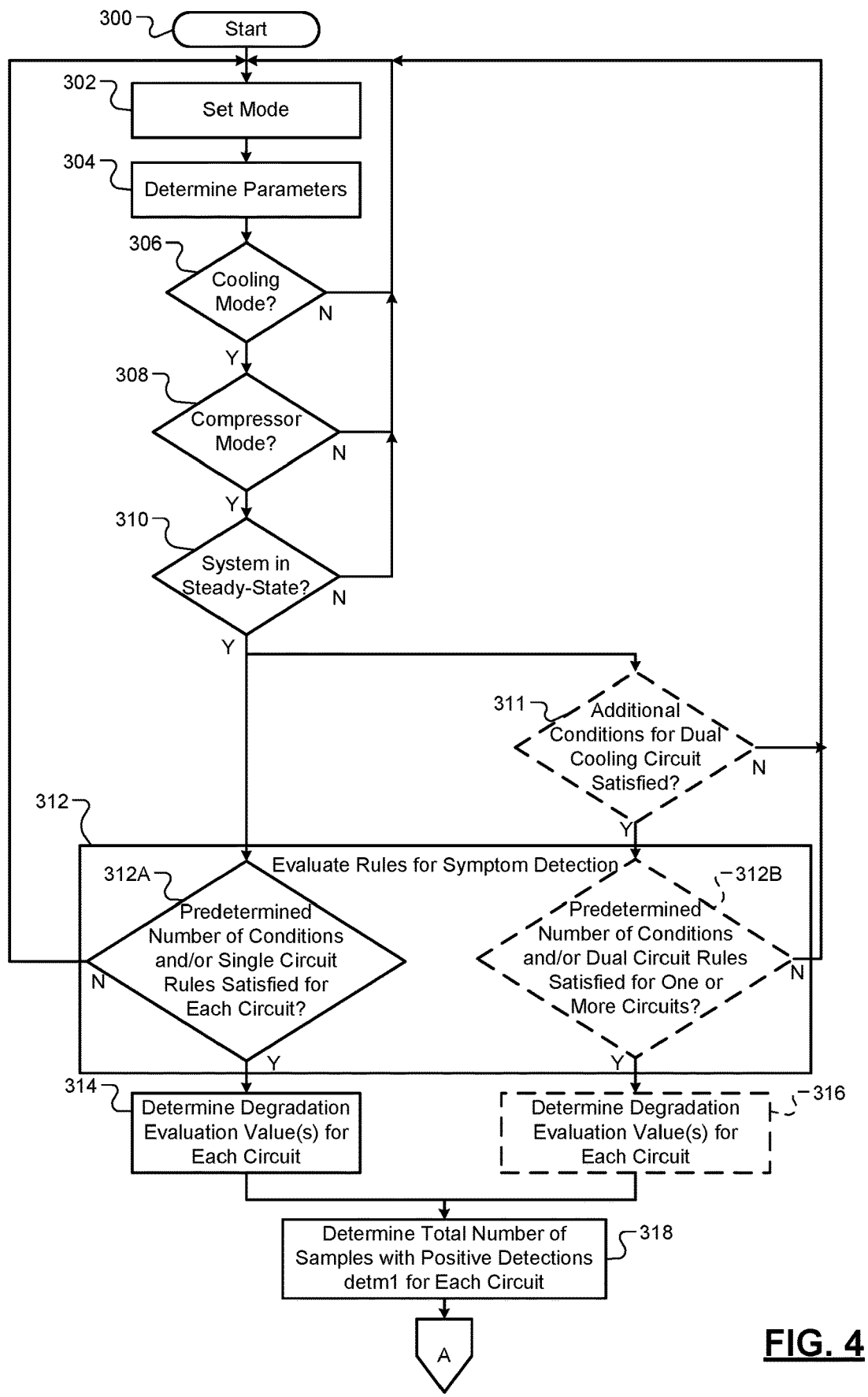
FIG. 4 is a logic flow diagram illustrating a first fault detection method in accordance with an aspect of the present disclosure.
Figure 6:
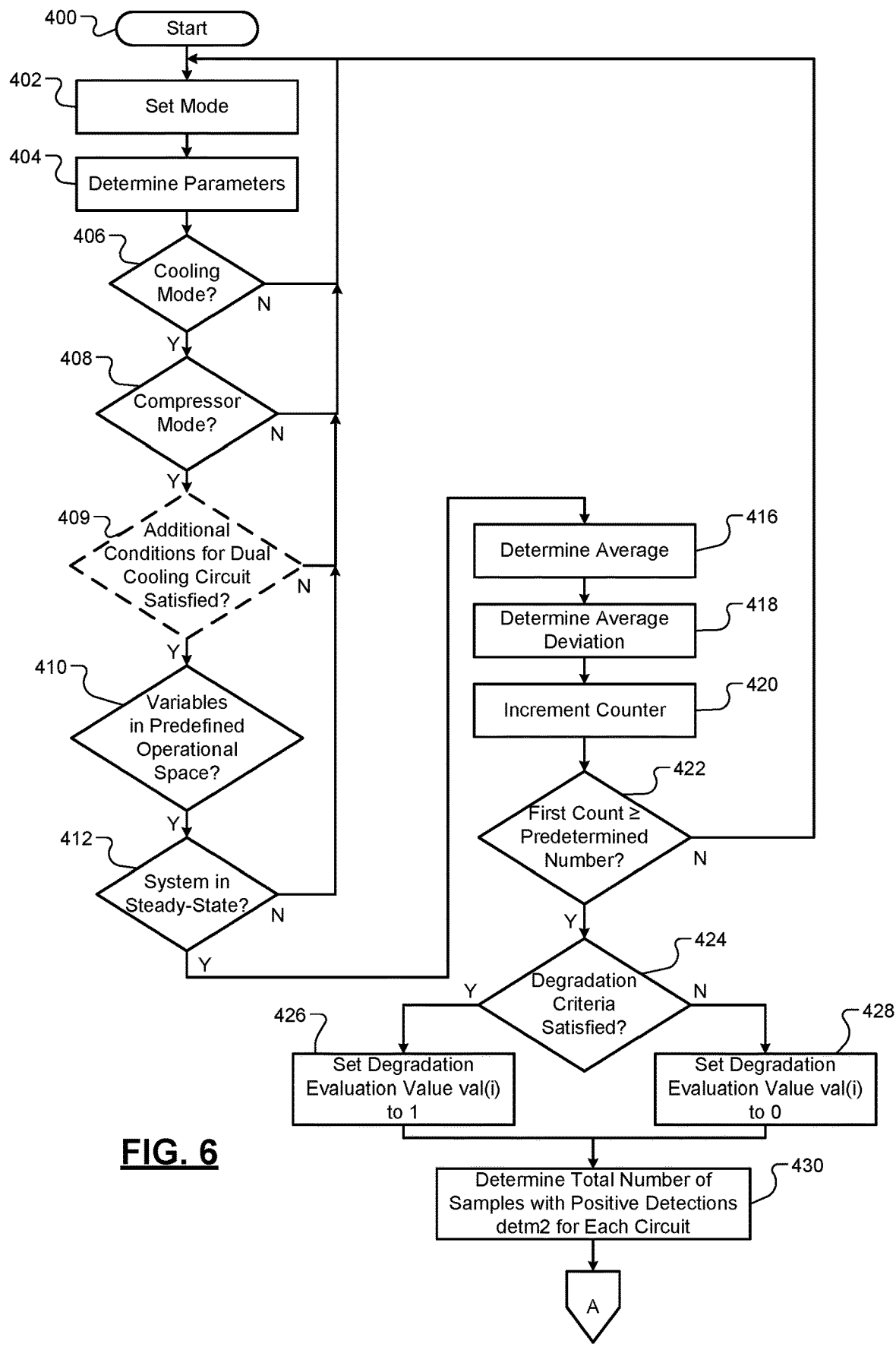
FIG. 6 is a logic flow diagram illustrating a second fault detection method in accordance with an aspect of the present disclosure.
Figure 9:
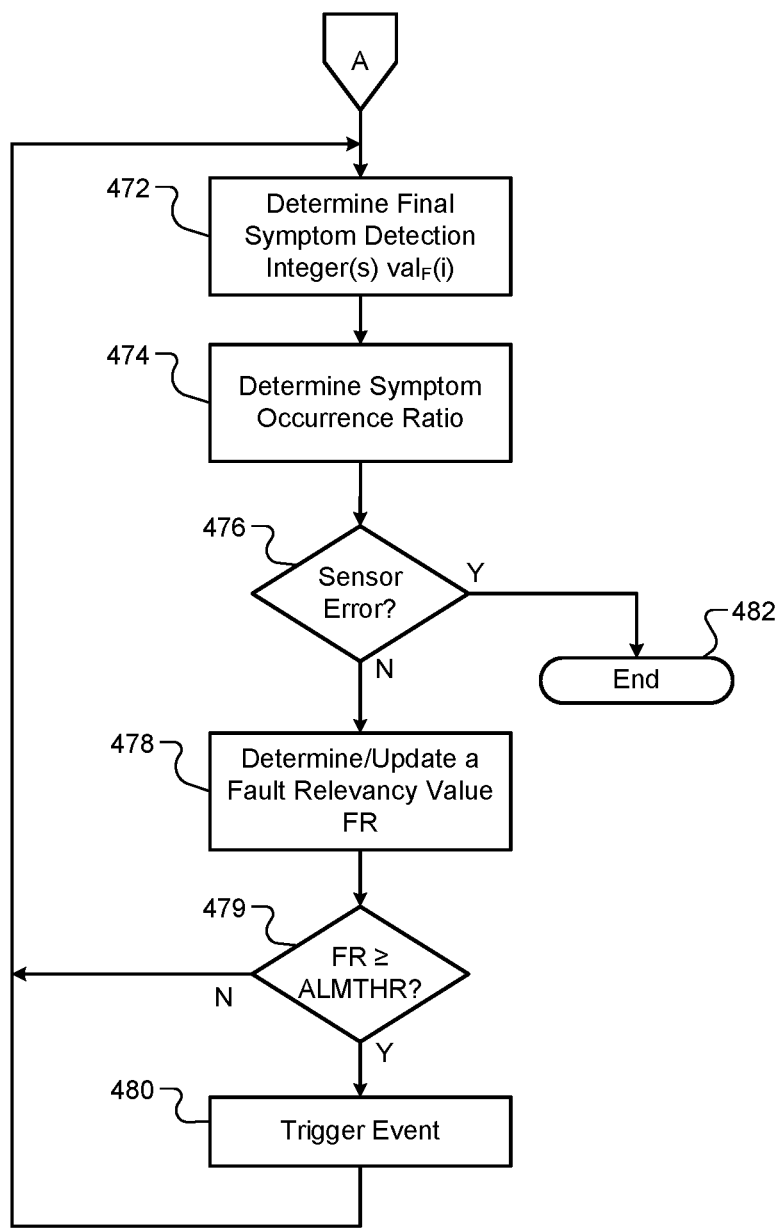
FIG. 9 is a logic flow diagram illustrating a post-processing method in accordance with an aspect of the present disclosure.

For further defined structure of the modules of FIG. 3, see below provided methods of FIGS. 4, 6 and 9 and below provided definition for the term "module". The cooling systems disclosed herein may be operated using numerous methods, example methods are illustrated in FIGS. 4, 6 and 9. Although the following methods are shown as separate methods, one or more methods and/or tasks from separate methods may be combined and performed as a single method. The methods include detection of different degradations, such as leak detection, condenser coil fouling, filter dryer clogging, air filter clogging, and/or compressor wearing. Table 1 lists some of the reference variables utilized during the methods of FIGS. 4, 6 and 9.

TABLE 1

List of Referenced Variables

| Variable name | Description |
| --- | --- |
| ALMTHR | Is an integer value representing an amount of fault relevancy at which an alarm/countermeasure event is triggered. |
| RefrigLeak Pct | Is a calculated value of fault relevancy. This variable may be displayed with a units-of-measure in percentage (%). |
| SOratio | Is a calculated value representing "relative frequency" of symptoms occurrence within a sliding window. |
| val(i) | Categorical variable representing number of rules fulfilled at a particular sample (time instant). Val(i) is an integer value. |
| winsize | Size of sliding window which also represents a number of selected samples used for fault relevancy calculations. Winsize is an integer value. |
| BINtable | Matrix representing operational space of a cooling system. Each of the elements in the BINtable (referred to as a bin) may hold four values - an |

TABLE 1-continued

List of Referenced Variables

| Variable name | Description |
| --- | --- |
| | integer value and three values with two decimal place precision. These values are further described below. |
| CNTm2 | Is an integer variable equal to a total number of samples evaluated by the distance based method. |
| detm1 | Is an integer variable equal to a total number of detections by a rule based method. |
| detm2 | Is an integer variable equal to a total number of detections by an distance based method. |

For refrigerant leak detection and/or other degradation a corresponding function may be utilized and can be divided into three parts, based on provided functionality: A) pre-processing; B) symptom detection by two different methods (a rules based method and a distance based method), and C) a final relevancy calculation. Symptom detection is performed to evaluate criteria describing the low refrigerant level (or degradation) during system operation. The final relevancy calculation is used to return a calculated degradation (or refrigerant leak relevancy value). The functions and correspond functionality are described in more detail below.

Prior to and/or during performance of the methods of FIGS. 4, 6 and 9, the stated-pre-processing may be performed. This may include removing unqualified values (e.g. not a number (NAN) or out-of-range values), calculation of minute averages and steady state detection. NANs represent undefined or unrepresentable values. NANs can occur, for example, if a sensor is operating inappropriately or is inoperative or when spikes in values occur. Time instants including NAN values are removed and not used in further calculations. If the measurements are not uniformly sampled, one minute averages for the measured parameters are calculated for use in the disclosed functions and/or algorithms.

FIG. 4 shows a first fault detection method. This method is a rules based method and is based on opening of an EEV. The EEV opening percentage may be used as an indicator for compensation of low refrigerant leakage during system operation. Symptoms of low refrigerant leakage can be described based on a set of rules. While a low refrigerant leak exists, the set of rules may be satisfied.

Although the following tasks are primarily described with respect to the implementation of FIGS. 2-3, the tasks may be easily modified to apply to other implementations of the present disclosure. Some of the tasks may be simplified or not performed depending on whether the cooling system 100 includes the first cooling circuit 104, the second cooling circuit 108 and/or both of the cooling circuits 104, 108. The tasks may be iteratively performed.

The method may begin at 300. At 302, an operation mode may be set, such as a cooling mode, a compressor mode, or other operational mode (e.g., humidification mode, dehumidification mode, reheat mode, etc.). During the cooling mode, the cooling system 100 is not operating in the humidification mode, dehumidification mode, and reheat mode. During the compressor mode, the cooling system 100 is not operating in the PRE mode. The cooling system 100 may operate in the cooling mode while operating in the compressor mode. The mode module 250 may generate a mode signal MODE indicating the operating mode(s). This may be based on a steady-state signal SS generated by the steady-state module 260, bin variables BINVARs of the BIN table, and/or signals sent to PRE components (represented in FIG. 3 as PRE(s)). An example of a BIN table is shown as Table 5 below.

At 304, the modules 252, 254, 258 may determine (e.g., measure, monitor, and/or calculate) parameters and generate corresponding parameter signals. For example, the EEV module 252 may generate signals %OPEN1, %OPEN2 indicating opening percentages of EEVs 112, 122 based on signals EEV1, EEV2. Each of the signals EEV1, EEV2 may be determined as further described below with respect to FIG. 12. The signals %OPEN1, %OPEN2 may indicate actual openings (or positions) of the corresponding EEVs at a given time instant. The CFC module 254 may determine a CFC (may be in terms of a percentage) and/or load based on a control signal CTRL and a temperature setpoint TEMPSP. The CFC module 254 generates a CFC/LOAD signal indicating a CFC and/or compressor load value. The CFC module 254 may also generate compressor control signal PWM1-4 based on the control signal CTRL and the temperature setpoint TEMPSP. The condenser module 258 determines condenser pressures C1CondBAR, C2CondBAR and condenser setpoints C1CondSp, C2CondSp for the cooling circuits 104, 108 based on the signals OUT1-2, where BAR refers to a metric measurement unit et pressure.

The EEV module 252 may operate based on the CFC/LOAD signal. If the cooling system 100 is operating in a low compressor load condition (less than a predetermined amount of compressor load), the EEV module 252 may switch to operating in a gate logic mode. During the gate logic mode, the %OPEN1 for the cooling circuit 104 may be calculated as an average of maximum values instead of an average of values of EEV position over a predetermined interval (e.g., 1 minute). When not operating in the gate logic mode, other averages may include an average of values of EEV position over the predetermined interval. Similarly, during the gate logic mode, the %OPEN for the cooling circuit 108 is calculated as an average of maximum values instead of an average of values of EEV position over a predetermined interval (e.g., 1 minute). When not operating in the gate logic mode, other averages may include an average of values of EEV position over the predetermined interval.

At 306, the rules module 262 proceeds to task 308 if the cooling system 100 is operating in the cooling mode. At 308, the rules module 262 proceeds to task 310 if the cooling system 100 is operating in the compressor mode. During the compressor mode, one or more compressors (e.g., 116, 118, 126, 128) are operated and the cooling system 100 is not operating in the PRE mode. If the cooling system 100 is not operating in the cooling mode or the compressor mode, then task 302 may be performed or the method may end.

At 310, the steady-state module 260 determines if the cooling system 100 is operating in a steady-state, a predetermined set of parameters are at steady-state, and/or the parameters determined at 304 are at steady-state. As an example, the steady-state module 260 may determine whether one or more parameters are at the same respective values or within predetermined ranges of the same respective values for a predetermined period of time (e.g., one minute). As another example, the steady-state module 260 may determine if one or more of the signals TEMP1-4, SUC1-2, COND1-2, OUT1-2, CFC/LOAD, PWM1-4 have been at the same values or within predetermined ranges of the same values for the predetermined period of time. If one or more of the signals TEMP1-4, SUC1-2, COND1-2, OUT1-2, CFC/LOAD, PWM1-4 have been at the same values or within predetermined ranges of the same values for the predetermined period of time, then the cooling system 100 and/or the monitored parameters are determined to be at steady-state.

As another example, if the last predetermined number (e.g., 10) of sampled values or last predetermined number of minute averages of each of the signals TEMP1-4, SUC1-2, COND1-2, OUT1-2, CFC/LOAD, PWM1-4, are within 0.01%, then the corresponding parameter is determined to be at steady-state. If one or more of the signals TEMP1-4, SUC1-2, COND1-2, OUT1-2, CFC/LOAD, PWM1-4 remain constant or vary less than 1% for a predetermined period (e.g., 10 minutes), then the cooling system 100 may be determined to be operating in quasi-steady-state mode and the rules can be evaluated (i.e. task 312 can be performed). Tasks 302-310 may be performed for each of the cooling circuits 104, 108 on a circuit-by-circuit basis or for the cooling system 100 as a whole. Tasks 306-310 may be performed in a different order than shown. For example, task 310 may be performed prior to task 306. As another example, task 311 may be performed prior to task 310. If both of the cooling circuits 104, 108 are used, task 311 may be performed if neither of the cooling circuits 104, 108 is operating in the PRE mode.

At 311, if the cooling system 100 includes dual cooling circuits, then additional conditions may be met prior to proceeding to task 312. As a first example, the rules module 262 may determine whether the compressor(s) of the first cooling circuit 104 are operating at the same loading as the compressor(s) of the second cooling circuit 108. If the compressors of the first cooling circuit are operating under the same loading as the compressors of the second cooling circuit, task 312 may be performed, otherwise task 302 may be performed. As a second example, the rules module 262 may determine whether both compressors of each of the cooling circuits 104, 108 are either ON or OFF. If one of the compressors of one of the cooling circuits is ON while the corresponding tandem compressor of the same cooling circuit is ON, then task 312 may be performed. If one of the compressors of one of the cooling circuits is ON while the corresponding tandem compressor of the same cooling circuit is OFF, then task 302 may be performed. As a third example, the rules module 262 may determine whether both %OPEN1 and %OPEN2 determined while operating in the gate logic mode are each greater than or equal to a predetermined % (e.g., 25%). If %OPEN1, and %OPEN2 are greater than or equal to the predetermined %, then task 310 may be performed, otherwise task 302 may be performed. In one embodiment, all of the above-stated three example conditions are satisfied prior to proceeding to task 312.

At 311, the sensor module 264 may determine if there is a fault (or error) with one of the sensors in the cooling system 100. The sensor module 264 may determine whether there is an error based on, for example, one or more of the signals TEMP1-4, SUC1-2, COND1-2, %OPEN1, %OPEN2, and TA and/or other signals disclosed herein. The sensor module 264 may generate a sensor fault signal SENSFAULT to indicate the sensor with the fault and/or the type of fault detected. As an example, if a temperature sensor or an EEV sensor is inoperative or providing a faulty reading, the sensor fault signal SENSFAULT may indicate that there is a fault with one or more of the sensors, the sensors that have the faults, and the type of faults detected. If there is an error, the fault relevancy value FR may not be updated and task 302 may be performed or the method may end. If there is not an error, task 312 may be performed. Task 312 may be performed only if there is not an error. If task 312 is not performed, the fault relevancy value FR may be maintained at a same previously determined value until the fault is cleared.

When the cooling system 100 is operating in a steady-state condition, one minute averages of selected variables (e.g., EEV opening percentages, superheat values, etc.) may be evaluated to determine whether the selected variables fulfill defined rules. See below task 312. A steady-state condition may be determined to exist when (i) the cooling system 100 is operating in the cooling mode without providing humidification, dehumidification and/or reheat, and (ii) a CFC has remained constant (or has not changed by more than a predetermined %) for a predetermined period of time (e.g., 3 minutes).

At 312, the rules module 262 evaluates the parameters with respect to the rules (e.g., selected one or more of the rules in Tables 2 and 3). This evaluation may be based on %OPEN1, %OPEN2, SH1, SH2, CFC, SHSPC1, SHSPC2, C1CondBAR, C2CondBAR, C1CondSP, and/or C2CondSP. Each of the rules may have one or more conditions that are to be satisfied. In one embodiment task 314 and/or task 316 is performed if one or more of the conditions are satisfied. A predetermined number of conditions and/or rules may be required to be satisfied prior to proceeding to task 314 and/or task 316. This may be true for a single cooling circuit implementation or one or more of the cooling circuits in a dual cooling circuit implementation.

Although a certain number of rules are shown for the single cooling circuit and the dual cooling circuit implementations, any number of rules may be evaluated for each of the implementations. An example rule for a single cooling circuit of a cooling system (e.g., the cooling system 100) is provided below with respect to Table 2. Although the rules of Table 2 are shown for circuit 1 (or cooling circuit 104), the rules may be used for circuit 2 (or cooling circuit 108). Determining whether the rule(s) for the single cooling circuit implementation are satisfied for each cooling circuit is represented by decision block 312A. Determinations of whether the rules for the single circuit implementation are satisfied may be made for each of the cooling circuits (e.g. for the single cooling circuit in a single circuit implementation and for each of the cooling circuits in a dual circuit implementation). Examples of rules for a dual cooling circuit of a cooling system (e.g., the cooling system 100) are provided below with respect to Table 3. Determining whether the rule(s) for the dual cooling circuit implementation are satisfied for each cooling circuit is represented by decision block 312B. As an alternative or in addition to determining whether the rules for the dual cooling circuit are satisfied for one or more of the cooling circuits in the dual cooling circuit implementation, the rules module 262 may also determine whether the rules for the single circuit implementation are satisfied by one or more of the cooling circuits. Thus, task 312A may be performed for a single cooling circuit implementation and one or more of tasks 312A and 312B may be performed for each of the cooling circuits in a dual cooling circuit implementation.

Although certain example values are shown in Tables 2-3, such as example percentages, decimal values, integer values, etc., these values may be replaced with other predetermined values. Although 3 rules are shown for the single circuit cooling system, one of the rules may not be used when performing task 312. For example, in one embodiment, rule 1 of Table 2 is used. In another embodiment, rules 2-3 of Table 2 are used. Each of the rules of Table 2 may be applied to each circuit of a dual cooling circuit system. Although 4 rules are shown for the dual circuit cooling system, one or more of the rules of Table 3 may not be used and one or more of the rules of Table 2 may be used when performing task 312. For example, in one embodiment, rule 2 of Table 2 and rule 1 of Table 3 are used for the dual circuit cooling system, where rule 2 of Table 2 is applied to the second cooling circuit of the dual circuit cooling system. In another embodiment, rules 3-4 of Table 3 are used for the dual circuit cooling system. Although the tables show certain values and/or coefficients, other predetermined values and/or coefficients may be used.

TABLE 2

Rule set for a single circuit cooling system.

| Description | Note |
|---|---|
| If % OPEN1 ≥ 0.99 and SH1 [K] ≥ 1.5 · SHSPC1 [K] and either C1CondBAR < 0.95 · SHSPC1 or CFC % ≤ 67%, then Rule 1 satisfied. | Rule 1 for Single Circuit |
| If % OPEN1 ≥ 99% and SH1 [K] ≥ 1.5 · C1 SHSP [K] and C1Cond [BAR] < 0.95 · C1Cond SP [BAR], then Rule 2 satisfied | Rule No. 2 for Single Circuit |
| If % OPEN1 ≥ 99% and SH1 [K] ≥ 1.5 · C1 SHSP [K] and CFC % < 67%, then Rule 3 satisfied | Rule No. 3 for Single Circuit |

TABLE 3

Rule set for a dual circuit cooling system.

| Description | Note |
|---|---|
| If % OPEN2 − % OPEN1 > 10%, then Rule 1 satisfied. | Rule 1 for Dual Cooling Circuit |
| If either (i) % OPEN2 ≥ 0.99 and SH2 ≥ 1.5 · SHSPC2 [K] and CFC % < 67%, or (ii) SH2 − SH1 > 10, then Rule 2 satisfied. | Rule 2 for Second Cooling Circuit of Dual Circuit Cooling System |
| If % OPEN1 > max(% OPEN2 · 1.25, % OPEN2 + 16%), where max refers to the maximum (or larger) of the 2 values separated by a comma, then Rule 3 satisfied. | Rule 3 for First Cooling Circuit of Dual Circuit Cooling System |
| If % OPEN2 > max(% OPEN1 · 1.1, % OPEN1 + 6%), where max refers to the maximum of the 2 values separated by a comma, then Rule 4 satisfied. | Rule 4 for Second Cooling Circuit for Dual Circuit Cooling System |

At 314, the rules module 262 performs a symptom detection algorithm for the single cooling circuit implementation to determine if there is a fault (or whether the cooling system is likely operating with a particular degradation, such as a refrigerant leak). The symptom detection algorithm is used to identify parameter samples determined when the cooling system was likely operating with the degradation. Task 314 is a portion and/or one example of the symptom detection algorithm. Other examples are provided below with regards to the methods of FIGS. 6 and 9. Thus, the symptom detection algorithm may be implemented based on the rules based method, the distance based method and/or a combination of both the rules based method and the distance based method.

At 316, the rules module 262 performs a symptom detection algorithm for the dual cooling circuit implementation to determine if there is a fault (or whether the cooling system is likely operating with a particular degradation, such as a refrigerant leak). The symptom detection algorithm is used to identify parameter samples determined when the cooling system was likely operating with the degradation. Task 316 is a portion and/or one example of the symptom detection algorithm. Other examples are provided below with regards to the methods of FIGS. 6 and 9. Thus, the symptom detection algorithm may be implemented based on the rules based method, the distance based method and/or a combination of both the rules based method and the distance based method.

The symptom detection algorithms of tasks 314, 316 provide degradation evaluation values (integer values) val(i) from a region <0,1> for each evaluated sample or average sample over a predetermined period (e.g., 1 minute). For each of the cooling circuits 104, 108, val(i) may be determined based on the following logic. If none of the rules were fulfilled, val(i)=0. If one of the rules was fulfilled, val(i)=1. In one embodiment, the degradation evaluation value val(i) is equal to the number of rules satisfied. The total number of samples having positive detections (e.g., samples having one or more rules satisfied) is stored as variable detm1 by the rules module 262 and determined at 318. The method may end subsequent to task 318 or may proceed to the method of FIGS. 6 and/or 9. The method of FIG. 6 may be performed while performing the method of FIG. 4.

Figure 5:
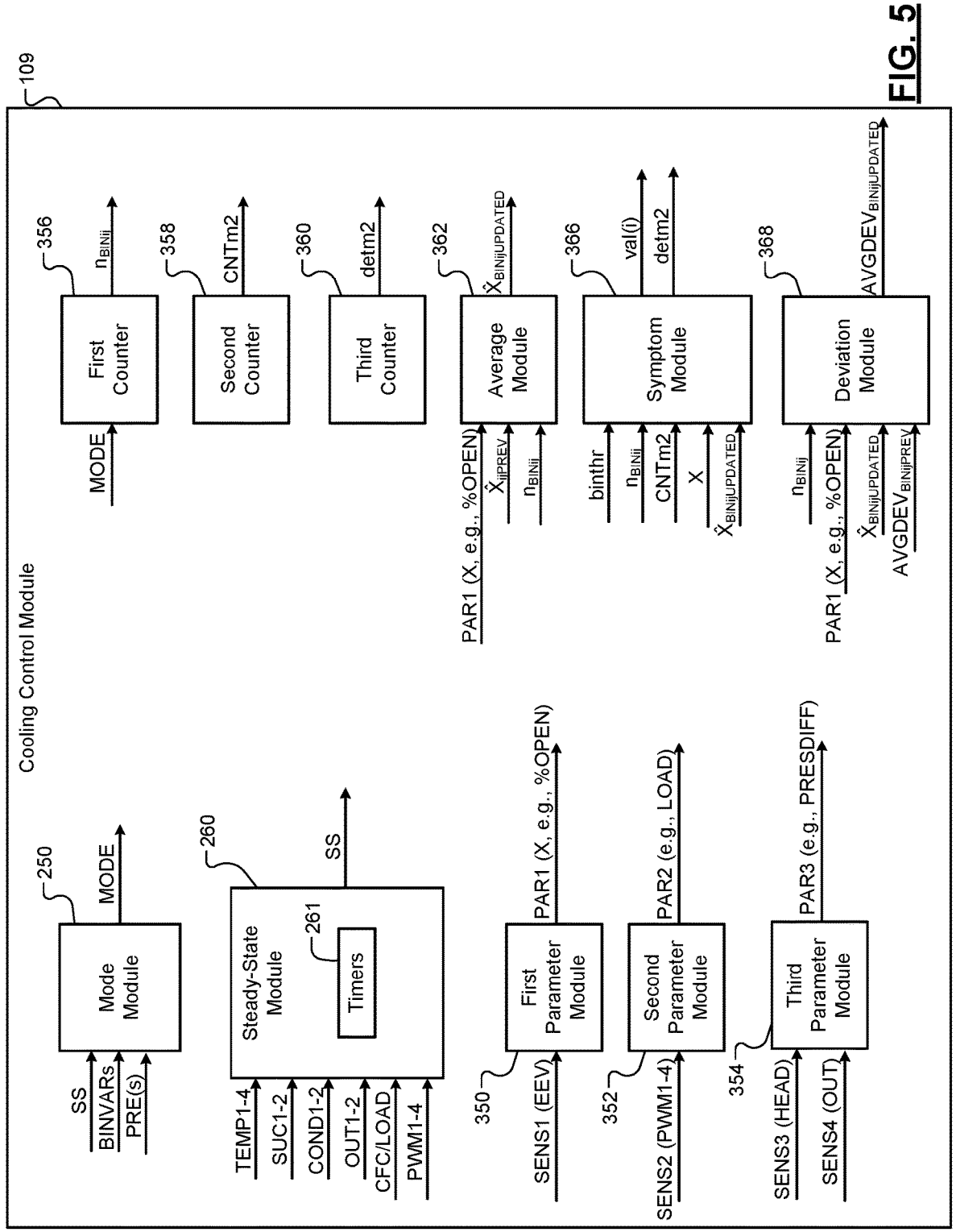
FIG. 5 is a functional block diagram of another portion of the cooling control module of FIG. 2 in accordance with an aspect of the present disclosure.

FIG. 5 shows another portion of the cooling control module 109. The cooling control module 109 may include the mode module 250, the steady-state module 260, parameter modules 350, 352, 354, counters 356, 358, 360, an average module 362, a symptom module 366, and a deviation module 368. The modules of FIG. 5 are further described below with respect to the embodiments of FIGS. 6 and 9.

FIG. 6 is a logic flow diagram illustrating a second fault detection method. The second fault detection method is a distance based method, which may include determining a difference (or distance) between an actual value of a parameter and an average of values of that parameter for each of one or more bins. This method may also include determining an average deviation for each bin, which is an average of the differences calculated for that bin. This method, as with the other methods disclosed herein, is applicable for a single cooling circuit, a dual circuit cooling circuit, and/or other cooling circuit implementations. It can be challenging to select a single threshold to detect a system performance degradation (e.g., a refrigerant leak or other degradation). For this reason, the distance based method calculates certain statistics (e.g., average deviation) instead of estimating a single threshold. The distance based method is based on historical trending but without a need of historical data storage allowing the method to be implemented in memory limited controllers.

The distance based method may be based on the assumption that a distance monitored parameter X (e.g., EEV open % may be used for leak detection) has a relationship with one or more driving conditions (e.g., driving condition parameters A and B). Examples of driving condition parameters are compressor loading percentage and pressure differential for leak detection. Table 4 provides examples of parameters that may be monitored as distance monitored parameters or driving condition parameters for corresponding degradations. Although certain parameters are provided with respect to certain degradations, other parameters and/or different parameters may be monitored than that shown in Table 4. Also, although some of the parameters are not shown with respect to one of the degradations, these parameters may be monitored for one or more of these degradations and/or for other degradations not shown in Table 4.

TABLE 4

Degradations and Corresponding Parameters

| Parameters | Refrigerant Leak | Condenser Coil Fouling | Filter Dryer Clogging | Air Filter Clogging | Compressor Wearing |
|---|---|---|---|---|---|
| Suction Pressure | ✓ | ✓ | ✓ | | ✓ |
| Suction Temperature | | | | | |
| Discharge Pressure | | | | | ✓ |
| Discharge Temperature | | | | | |
| Condenser Inlet Pressure | | | | | |
| Condenser Inlet Temperature | | | | | |
| Condenser Outlet Pressure | ✓ | | | | |
| Condenser Outlet Temperature | | ✓ | | | |
| Condenser Fan Speed | | ✓ | | | |
| Outside Air Temperature | | ✓ | | | |
| Filter Dryer Inlet Pressure | | | ✓ | | |
| Filter Dryer Outlet Pressure | | | ✓ | | |
| Air Filter Differential Pressure | | | | ✓ | |
| Compressor Power Meter | | | | | ✓ |
| Compressor Loading Percentage | | ✓ | ✓ | | ✓ |
| Compressor Differential Pressure | | | | | |
| EEV Open Position | ✓ | | | | |
| Indoor Blower Speed | ✓ | | | ✓ | |

If the driving condition parameters (e.g., A and B) are constant or have minimal variation over a predetermined period of time, then the one or more distance monitored parameters (e.g. X) should also be constant or have minimal variation over the same period of time if there is no degradation. For example, for the same condition of compressor loading percentage and pressure differential, the EEV open percentage should be maintained at a same value or within a predetermined range of the same value if there is no degradation. In case of a refrigerant leak, the EEV open percentage begins to increase.

Figure 7:
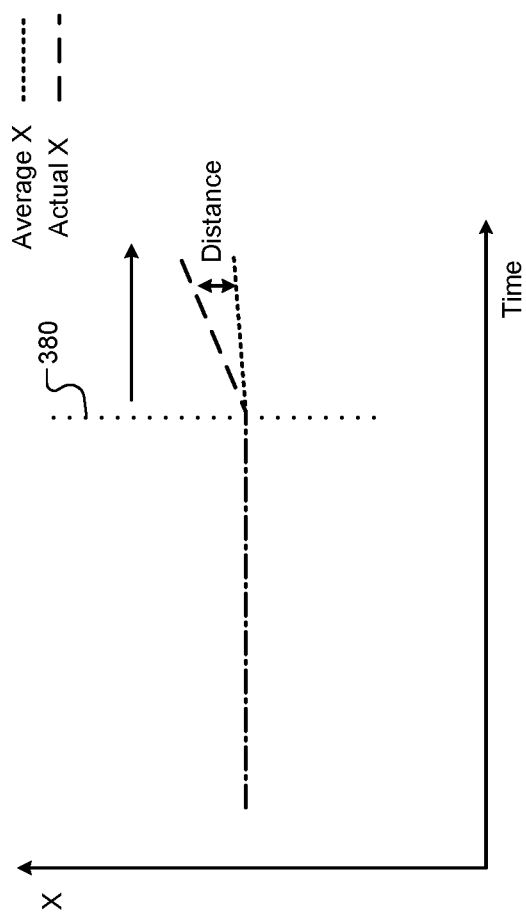
FIG. 7 is a plot illustrating parameter trending away from an average due to degradation.

FIG. 7 shows a plot illustrating parameter separation from an average of that parameter over time due to degradation. It can be seen from FIG. 7 that an average of X (one of the parameters disclosed herein) overlaps with an actual X curve during normal operation (i.e. no degradation) and the average of X starts to be biased from the X curve after the corresponding cooling system begins to degrade. Degradation begins at dotted line 380 and increases over time. As long as the average of X is known, the distance between new X and the average of X is calculated and may be used to indicate the degradation. As an example, the parameter X may be EEV open percentage. Once the distance between the average value of EEV open percentage and the actual value of the EEV open percentage reaches some defined value (threshold) for the same (or similar) driving conditions, a symptom of refrigerant leak may be detected. The distance may be used to indicate degradation and an amount of degradation. The average deviation may be used in addition to the distance to determine an amount of degradation.

An operational parameter space of a cooling system may be divided into small subsets called bins. Each bin may represent a specific driving condition and is defined by a small range of values of one or more variables, such as the variables A and B. In case of refrigerant leak detection, the variables A and B may refer to a compressor loading percentage and a pressure differential. The bins are organized in a BINtable, which includes BIN variables BIN-VARs. An example of a BINtable is shown as Table 5, where n is the sample number for the corresponding value of X, the values of A are associated with rows, and the values of B are associated with columns. For range space i of A and range space j of B, two values are stored. The first value is the average of valid historical values of X at a same condition of A and B. The other value is a count of data points (or values of X) used to calculate the average.

TABLE 5

BIN TABLE

| A | B | | | | | |
|---|---|---|---|---|---|---|
|  | 0-5 | 5-10 | 10-15 | — | — | — |
| 0-5 | $x_{11}, n_{11}$ | $x_{12}, n_{12}$ | $x_{13}, n_{13}$ | | | |
| 5-10 | $x_{21}, n_{21}$ | $x_{22}, n_{22}$ | $x_{23}, n_{23}$ | | | |
| 10-15 | $x_{31}, n_{31}$ | $x_{32}, n_{32}$ | $x_{33}, n_{33}$ | | | |
| ⋮ | | | | | $\hat{x}_{ij}, n_{ij}$ | |

Examples of parameters that can be used to define an operational space for refrigerant leak detection can be found in Table 6. Any measures collected outside the operational space defined by minimum (min) and maximum (max) acceptable values may not be used by this method for evaluation purposes.

TABLE 6

BINtable Variables and Parameters

| Variable Name | Variable min Acceptable Value | Variable max Acceptable Value | Variable step (BIN range) value - This is Change in Variable from Previous Value of the Variable |
|---|---|---|---|
| Compressor loading percentage | 20% | 100% - 1 compressor in the circuit 200% - 2 compressors in the circuit (100% each) | 2% |
| Compressor pressure differential | 100 pounds-per-square inch (PSI) or | 300 PSI or equivalent barometric pressure | 4 PSI or equivalent barometric pressure |

TABLE 6-continued

BINtable Variables and Parameters

| Variable Name | Variable min Acceptable Value | Variable max Acceptable Value | Variable step (BIN range) value - This is Change in Variable from Previous Value of the Variable |
|---|---|---|---|
| | an equivalent pressure in barometric pressure (BAR) | | |

For each bin in the BINtable the following values may be calculated and stored: an average value of EEV open percentage; a number of samples n used for the calculation of values for the particular bin; an average deviation (DEV); and a bin threshold value binthr (e.g., 1.15 by default). The number of samples may be counted by the first counter 356, which may be based on the mode signal MODE. The value of the first counter is represented by $n_{BINij}$, where BINij represents a particular bin and i and j refer respectively to rows and columns of the BINtable. A total number of qualified and evaluated samples (for all bins) may be stored in a separate variable named CNTm2 and determined by the second counter 358. The values of the bins, the bin threshold values, the number of samples, and/or the total number of samples may be determined during and/or subsequent to one or more of below described tasks 404-412.

Although the tasks of FIG. 6 are primarily described with respect to FIGS. 2-3 and 5, the tasks may be applied to other implementations of the present disclosure. The tasks of FIG. 6 may be iteratively performed. The method of FIG. 6 may begin at 400. At 402, an operation mode may be set, such as a cooling mode, a compressor mode, or other operational mode (e.g., humidification mode, dehumidification mode, reheat mode, etc.). During the cooling mode, the cooling system 100 is not operating in the humidification mode, dehumidification mode, and reheat mode. During the compressor mode, the cooling system 100 is not operating in the PRE mode. The cooling system may operate in the cooling mode while operating in the compressor mode. The mode module 250 may generate a mode signal MODE indicating the operating mode(s). This may be based on: a steady-state signal SS generated by the steady-state module 260; bin variables BINVARs of the BIN table; and/or signals sent to PRE components (represented in FIG. 3 as PRE(s)). An example of a BIN table is shown as Table 5 above.

At 404, the modules 252, 254, 258, 350, 352, 354 may determine parameters and generate corresponding parameter signals. For example, the EEV module 252 may generate signals OPEN1, %OPEN2 indicating opening percentages of EEVs 112, 122 based on signals EEV1, EEV2. The CFC module 254 may determine a CFC and/or load based on a control signal a temperature setpoint TEMPSP (e.g., predetermined set temperature). The control signal CTRL may indicate a current control temperature, which may be biased away from the temperature setpoint TEMPSP. The cooling control module 109 may determine a difference between the current control temperature and the temperature setpoint TEMPSP. The CFC module 254 generates a CFC/LOAD signal indicating a CFC and/or compressor load value. The condenser module 258 determines condenser pressures C1CondBAR, C2CondBAR and condenser setpoints C1CondSp, C2CondSp for the cooling circuits 104, 108 based on the signals SUC1-2 and OUT1-2. The first parameter module 350 may determine a first parameter PAR1, which may be based on one or more signals from one or more sensors. As an example and for leak detection, the first parameter module 350 may determine an EEV open percentage based on the signals EEV1, EEV2. The second parameter module 352 may determine a second parameter PAR2, which may be based on one or more signals from one or more sensors. As an example and for leak detection, the second parameter module 352 may determine a compressor load based on the signals PWM1-4. The third parameter module 354 may determine a third parameter PAR3, which may be based on one or more signals from one or more sensors. As an example and for leak detection, the third parameter module 354 may determine a pressure differential based on the signals HEAD1, HEAD2, OUT1, OUT2.

The EEV module 252 may operate based on the CFC/LOAD signal. If the cooling system 100 is operating in a low compressor load condition (less than a predetermined amount of compressor load), the EEV module 252 may switch to operating in a gate logic mode. During the gate logic mode, the %OPEN1 for the cooling circuit 104 may be calculated as an average of maximum values instead of an average of values of EEV position over a predetermined interval (e.g., 1 minute). When not operating in the gate logic mode, other averages may include an average of values of EEV position over the predetermined interval. Similarly, during the gate logic mode, the %OPEN for the cooling circuit 108 is calculated as an average of maximum values instead of average of values of EEV position over a predetermined interval (e.g., 1 minute). When not operating in the gate logic mode, other averages may include an average of values of EEV position over the predetermined interval.

At 406, the cooling control module 109 proceeds to task 408 if the cooling system 100 is operating in the cooling mode. At 408, the cooling control module 109 proceeds to task 409 if the cooling system 100 is operating in the compressor mode. During the compressor mode, one or more compressors (e.g., 116, 118, 126, 128) are operated and the cooling system 100 is not operating in the PRE mode. If both of the cooling circuits 104, 108 are used, task 410 is performed if neither of the cooling circuits 104, 108 is operating in the PRE mode. If the cooling system 100 is not operating in the cooling mode or the compressor mode, then task 402 may be performed or the method may end.

At 409, if the cooling system 100 includes dual cooling circuits, then additional conditions may be met prior to proceeding to task 410. As a first example, if the opening percentage(s) of the one or more EEVs of the cooling system 100 are each greater than or equal to a predetermined amount during the gate logic mode, then task 410 may be performed. As another example, the cooling control module 109 may determine whether both %OPEN1 and %OPEN2 determined while operating in the gate logic mode are each greater than or equal to a predetermined % (e.g., 25%). If %OPEN1, and %OPEN2 are greater than or equal to the predetermined %, then task 410 may be performed, otherwise task 402 may be performed.

At 409, the sensor module 264 may determine if there is a fault (or error) with one of the sensors in the cooling system 100. The sensor module 264 may determine whether there is an error based on, for example, one or more of the signals TEMP1-4, SUC1-2, COND1-2, %OPEN1, %OPEN2, and TA and/or other signals disclosed herein. The sensor module 264 may generate a sensor fault signal SENSFAULT to indicate the sensor with the fault and/or the type of fault detected. As an example, if a temperature sensor or an EEV sensor is inoperative or providing a faulty reading, the sensor fault signal SENSFAULT may indicate that there is a fault with one or more of the sensors, the sensors that have the faults, and the type of faults detected. If there is an error, the fault relevancy value FR may not be updated and task 402 may be performed or the method may end. If there is not an error, task 410 may be performed. Task 410 may be performed only if there is not an error. If task 410 is not performed, the fault relevancy value FR may be maintained at a same previously determined value until the fault is cleared.

At 410, the cooling control module 109 determines whether the cooling system 100 is operating in a predefined operational space (e.g., the operational space provided by Table 6). For leak detection, this may be based on the parameters PAR1, PAR2, and PAR3 and/or other BINVARs. This may include determine whether the parameters of interest are within respective predetermined ranges.

At 412, the steady-state module 260 determines if the cooling system 100 is operating in a steady-state, a predetermined set of parameters are at steady-state, and/or the parameters determined at 404 are at steady-state. As an example, the steady-state module 260 may determine whether one or more parameters are at the same respective values or within predetermined ranges of the same respective values for a predetermined period of time (e.g., one minute). As another example, the steady-state module 260 may determine if one or more of the signals TEMP1-4, SUC1-2, COND1-2, OUT1-2, CFC/LOAD, PWM1-4 have been at the same values or within predetermined ranges of the same values for the predetermined period of time. If the signals TEMP1-4, SUC1-2, COND1-2, OUT1-2, CFC/LOAD, PWM1-4 have been at the same values or within predetermined ranges of the same values for the predetermined period of time, then the cooling system 100 and/or the monitored parameters are determined to be at steady-state.

As another example, if the last predetermined number (e.g., 10) of sampled values or last predetermined number of minute averages of each of the signals TEMP1-4, SUC1-2, COND1-2, OUT1-2, CFC/LOAD, PWM1-4 are within 1%, then the corresponding parameter is determined to be at steady-state. If one or more of the signals TEMP1-4, SUC1-2, COND1-2, OUT1-2, CFC/LOAD, PWM1-4 remained constant or vary less than 1%, for a predetermined period (e.g., 10 minutes), the cooling system 100 may be determined to be operating in quasi-steady-state mode and the rules can be evaluated (i.e. task 416 can be performed). Tasks 402-412 may be performed for each of the cooling circuits 104, 108 on a circuit-by-circuit basis or for the cooling system 100 as a whole. Tasks 406-412 may be performed in a different order than shown. For example, task 412 may be performed prior to task 406.

At 416, the average module 362 determines an average of the monitored parameter X (e.g., the EEV open percentage, %OPEN1, and/or %OPEN2). Previous and updated versions of the average of X are shown as $X_{ijPREV}$ and $X_{ijUPDATED}$. This may be done using, for example, equation 1. The value of X (e.g., a current actual value of the EEV open percentage) is used to update the average value of X (e.g., the average value of the EEV open percentage) for particular bin.

$$\hat{X}_{BINijUpdated} = \frac{(\hat{X}_{BINijPREV} \cdot n_{BINij} + X)}{(n_{BINij} + 1)} \quad (1)$$

At 418, the deviation module 368 determines an average deviation AVGDEV for the particular bin according to, for example, equation 2, where abs is absolute value. Tasks 414-418 may be performed each time there is a new valid value of X.

$$AVGDEV_{BINijUpdated} = \frac{(AVGDEV_{BINijPREV} \cdot n_{BINij} + \text{abs}(X - \hat{X}_{BINij}))}{(n_{BINij} + 1)} \quad (2)$$

Equations 1 and 2 are valid as shown when $n_{BINij}$ is incremented after the evaluation of equations 1 and 2.

At 420, the first counter 356 increments $n_{BINij}$. At 422, the symptom module 366 determines whether the first count $n_{BINij}$ is greater than or equal to a predetermined number (e.g., 10). If the first count $n_{BINij}$ is greater than or equal to the predetermined number, then task 424 is performed, otherwise task 402 may be performed. The value of the first count $n_{BINij}$ (i.e. the number of samples used in calculations for the particular bin) is greater than or equal to the predetermined number for the distance based criterion (or criteria) to be evaluated, where BINij represents a particular bin and i and j refer respectively to rows and columns of the BINtable. All of the above mentioned calculations may be performed if the value of the first count $n_{BINij}$ is less than the predetermined number, but the distance based detection criterion (or criteria) described with respect to task 424 is not evaluated (i.e. no symptom is detected until the first count $n_{BINij}$ is greater than or equal to the predetermined number).

At 424, the symptom module 366 may determine whether a symptom of a particular degradation (e.g., refrigerant leak) exists by determining whether certain criteria are satisfied for that particular degradation. The symptom of refrigerant leak may, for example, be detected if equation 3 is satisfied, where $\text{binthr}_{BINij}$ represents a threshold value used for criteria evaluation in a particular bin, max is a maximum of the two values (i) $\text{binthr}_{BINij} \cdot \hat{X}_{BINij}$, (ii) $\hat{X}_{BINij}$+predefined value. The $\text{binthr}_{BINij}$ may be determined by a bin threshold module 452 based on AVGDEV, $\overline{X}_{BINij}$ and/or $CNT_{m2}$. This evaluation may be performed for (i) each bin having a corresponding first count greater than the predetermined number and satisfying corresponding criteria, and (ii) each particular degradation being detected.

$$X > \max(\text{binthr}_{BINij} \cdot \hat{X}_{BINij}, \hat{X}_{BINij}+\text{predefined value}) \quad (3)$$

If the criteria evaluated at 424 are satisfied, task 426 is performed otherwise task 428 is performed. The symptom module 366 determines, via a symptom detection algorithm, a degradation evaluation value val(i) from a region <0,1> for each evaluated sample and a predetermined amount of time (e.g., 1 minute). For each cooling circuit, a degradation evaluation value val(i) may be determined based on the following logic. If the criteria are fulfilled, the degradation evaluation value val(i) is set equal to 1 at 426. If the criteria are not fulfilled, the degradation evaluation value val(i) is set equal to 0 at 428. When evaluated for dual cooling circuits, valC1(i) and valC2(i) may be determined for the respective cooling circuits.

Task 430 is performed subsequent to tasks 426 and 428. At 430, a total number of samples having positive detections (e.g., samples having one or more rules satisfied) are stored as variable detm2. The total number of samples may be determined by the symptom module 366 or counted by the third counter 360. The method may end subsequent to task 430 and/or proceed to the methods of FIG. 4 or FIG. 9.

For improved performance of the distance based method, when the value of the second counter CNTm2 (i.e. total number of samples evaluated by the distance based method) reaches a predetermined threshold BINTHR (e.g., 10,000), the following task may be performed. Bins with $n_{BINij}$ greater than or equal to the first predetermined number (e.g., 10) are identified and this subset of bins are further evaluated as described above in tasks 424-430, where: (i) bins with $$\frac{AVGDEV_{BINij} \cdot 100}{\hat{X}_{BINij}} > PD,$$

the value of $binthr_{BINij}$ is artificially increased (i.e. temporarily increased in an atypical manner to provide a predetermined outcome) from a first predetermined value (e.g., 1.15) to a second predetermined value (e.g. 1.20), where PD is a third predetermined value (e.g., 5), and (ii) bins with $$\frac{AVGDEV_{BINij} \cdot 100}{\hat{X}_{BINij}} \le PD,$$

the value of $n_{BINij}$ is artificially increased by a fourth predetermined value (e.g., 100). These adjustments may be performed by BIN threshold module of FIG. 8. By performing this routine, probability of the bins providing stable results is artificially increased to improve the detection performance. However, the influence of bins with greater average deviation for the monitored parameters is suppressed in order to prevent false alarms.

Figure 8:
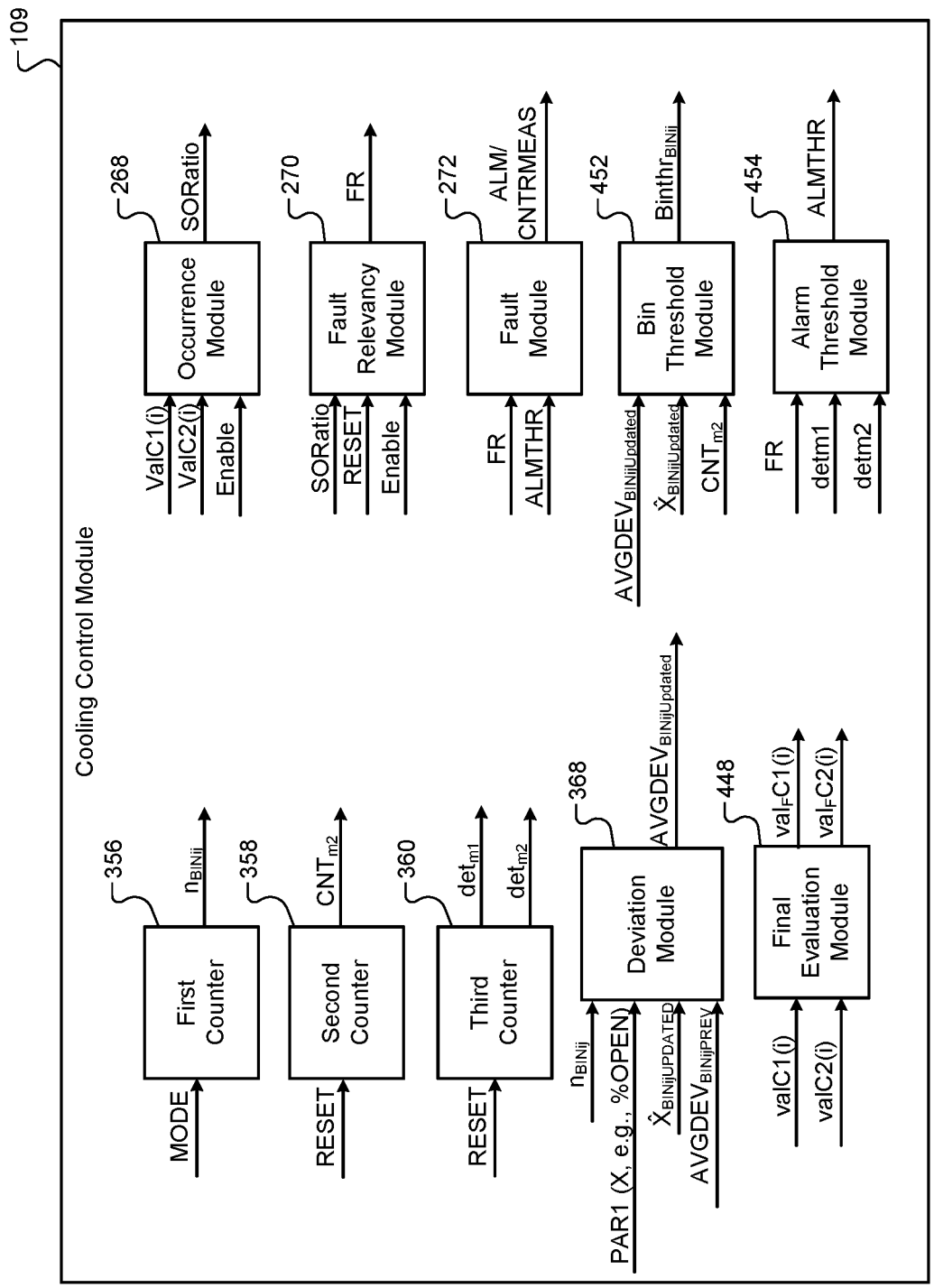
FIG. 8 is a functional block diagram of another portion of the cooling control module of FIG. 2 in accordance with an aspect of the present disclosure.

FIG. 8 shows another portion of the cooling control module 109. The cooling control module 109 includes the modules 268, 270, 272, 368, counters 356, 358, 360, a final evaluation module 448, the bin threshold module 452, and an alarm threshold module 454. The counters and modules of FIG. 8 are further described below with respect to the method of FIG. 9.

FIG. 9 shows a logic flow diagram illustrating a post-processing method. Although the tasks of FIG. 9 are primarily described with respect to FIGS. 2-3, 5 and 8, the tasks may be applied to other implementations of the present disclosure. The tasks of FIG. 9 may be iteratively performed and may be performed for each degradation being detected. The method may begin at 470. At 472, the final evaluation module 448 may determine final degradation evaluation values. Since a similar logic was applied during symptom detection for both the rule based and distance based methods, resulting degradation evaluation values for these methods can be merged. As an example, for each sample provided over a predetermined amount of time (e.g., 1 minute), a final symptom detection integer $val_F(i)$ may be obtained from a region <0,2> based on the following logic. If after executing both methods there is no detected symptom based on either of the methods for a particular degradation, the final symptom detection integer $val_F(i)$ is set equal to 0. If after executing both methods there is a detected symptom based on only one of the methods, the final symptom detection integer $val_F(i)$ is set equal to 1. If after executing both methods there are symptom detections based on both methods, the final symptom detection integer $val_F(i)$ is set equal to 2.

Figure 10:
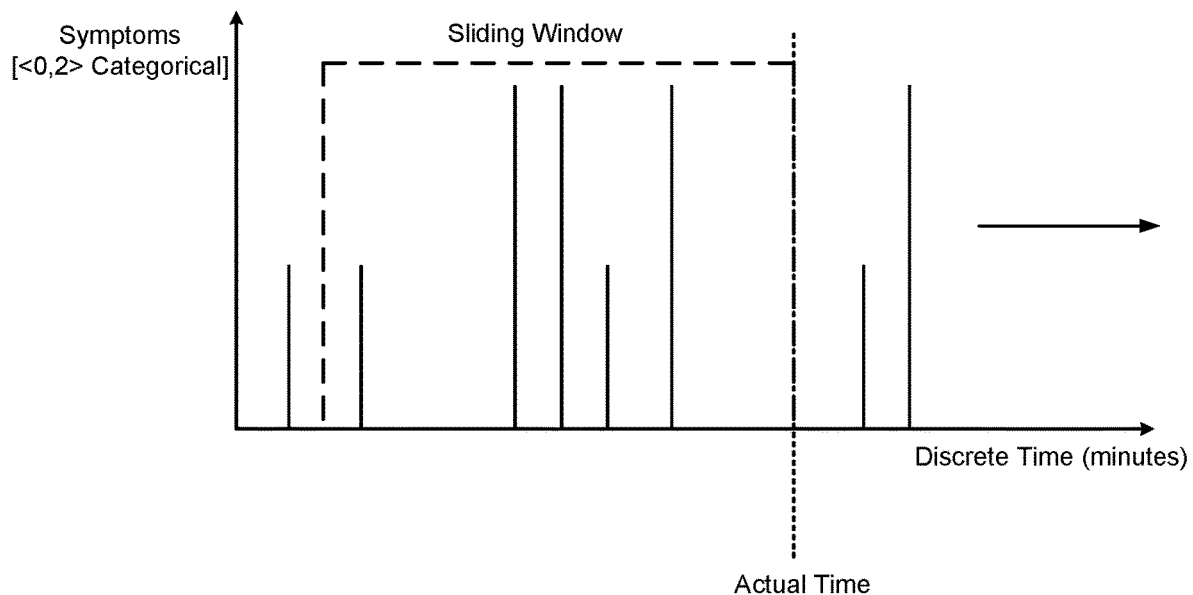
FIG. 10 is a plot illustrating a sliding window over detected symptom instances in accordance with an aspect of the present disclosure.

At 474, the occurrence module 268 determines a symptom occurrence ratio SOratio. Equation 4 may be used to determine the a relative frequency of rules fulfilled within a predetermined window, where val(i) represents the rules fulfilled for a given number of samples and a predetermined window size winsize. Winsize is the size of a sliding window. The relative frequency is expressed as the symptom occurrence ratio SOratio. The frequency at which the rules are fulfilled over a given period of time is used to determine whether the cooling system 100 is experiencing a type of degradation (e.g., a leak). The higher the frequency, the more likely that the type of degradation exists. An example of a sliding window is shown in FIG. 10, where t is time. The moving window may have a predetermined size, which may be stored in the memory 220. As an example, the winsize may have a minimum size of 10 and a maximum size of 30 and a default size of 20. The higher the number of samples selected based on the winsize, the slower the reaction time associated with determining the fault relevancy value FR and triggering an event at 480. In one embodiment, the sliding window has a pre-defined length of 15 samples or 15 minutes (1 minute per sample).

$$SO_{ratio} = \frac{\sum_{1}^{winsize} val(i)}{winsize} \cdot 100 \quad (4)$$

The degradation evaluation value val(i) represents rules fulfilled for a given time instant. In case of up to 2 rules, possible val(i) values are: 0—if none of the rules are fulfilled; and 1—if 1 of the rules are fulfilled. If the SOratio is high or exceeds a high threshold, then a high number of rules have been fulfilled during a period of the window. This causes the fault relevancy value FR to be increased, as described below. If the SORatio is low or drops below a low threshold, then a low number of rules or no rules have been fulfilled during the period of the window. This causes the fault relevancy value FR to be decreased.

At 478, the relevancy module 270 determines and/or updates the fault relevancy value FR. The fault relevancy value FR is expressed as a percentage. The fault relevancy value FR may be for a particular type of degradation (e.g., refrigerant leak detection). The fault relevancy value FR may initially start at 0% for a first iteration of task 478 and increase to a value between 0% and 100% during subsequent iterations of task 478. A sliding window may be used to select samples used for a calculation of a new (or updated) value of the fault relevancy value FR. A default window size (e.g., 20 samples) over a predetermined period of time (e.g., 20 minutes). The number of samples and the predetermined period of time may be adjusted.

Time instants when the rules were fulfilled may be identified and a smart aggregation function may be applied in order to calculate the fault relevancy value FR. Time instants when the rules were fulfilled contribute positively to the fault relevancy value FR. On the other hand, time instants without rules being fulfilled (i.e. when the cooling system is likely to operate at a sufficient refrigerant level) contribute negatively to the fault relevancy value FR.

For each iteration of task 478, the relevancy module 270 may update the fault relevancy value FR based on the SOratio value. This may be done according to, for example, Table 7. As another example, the fault relevancy value FR may be increased by predetermined percentage (e.g., 0.33%) if the SOratio is greater than a first predetermined value (e.g., 50). The fault relevancy value FR may be decreased by predetermined percentage (e.g., 0.033%) if the SOratio is less than a second predetermined value (e.g., 10). The fault relevancy value FR may be maintained at a same value if between the first predetermined value and the second predetermined value.

TABLE 7

SOratio value influence on Fault Relevancy increment

| SOratio value % | Fault Relevancy Adjustment Amounts |
|---|---|
| 0 | −0.02% |
| >0 & <=20 | without change (i.e. +0%) |
| >20 & <50 | +0.2% |
| >=50 & <75 | +0.5% |
| >=75 & <90 | +1% |
| >=90 | +2% |

A separate fault relevancy value FR may be determined and adjusted for each cooling circuit. The fault relevancy values may remain constant (i.e. hold previous values) when the cooling system 100 is OFF, but provided with power. The fault relevancy values also remain constant during time instances when neither the rule based criteria nor the distance based criteria could be evaluated (e.g. the cooling system 100 was not at steady state). The fault relevancy values are updated when the cooling system 100 is ON and there are values that satisfy the above described criteria available within the predetermined window.

At 479, the fault module 272 determines whether to trigger an event. This may occur when the fault relevancy value FR reaches a predefined threshold ALMTHR. The threshold adjustment module 274 may set un updated predefined threshold ALMTHRUpdated based on a previous predefined threshold ALMTHRPrev and/or one or more of RESET, detm1, detm2. The parameters RESET and detm2 are described below. As an example, the threshold ALMTHR may have a minimum value of 60%, a maximum value of 90% and a default value of 67%. This may include generating an alarm signal and/or performing a countermeasure. The alarm signal may indicate the type of degradation, the severity of the degradation, etc. The countermeasure may be turning OFF the cooling system 100, cycling the cooling system 100 between ON and OFF states, and/or reducing via the cooling control module the CFC % to below a predetermined threshold. The threshold ALMTHR may be a default value (e.g., 67%). The threshold ALMTHR may be adjusted. The adjustment may be based on a user input or as further described below. Task 480 is performed to trigger the event. If an event is not triggered, task 472 may be performed.

Figure 11:
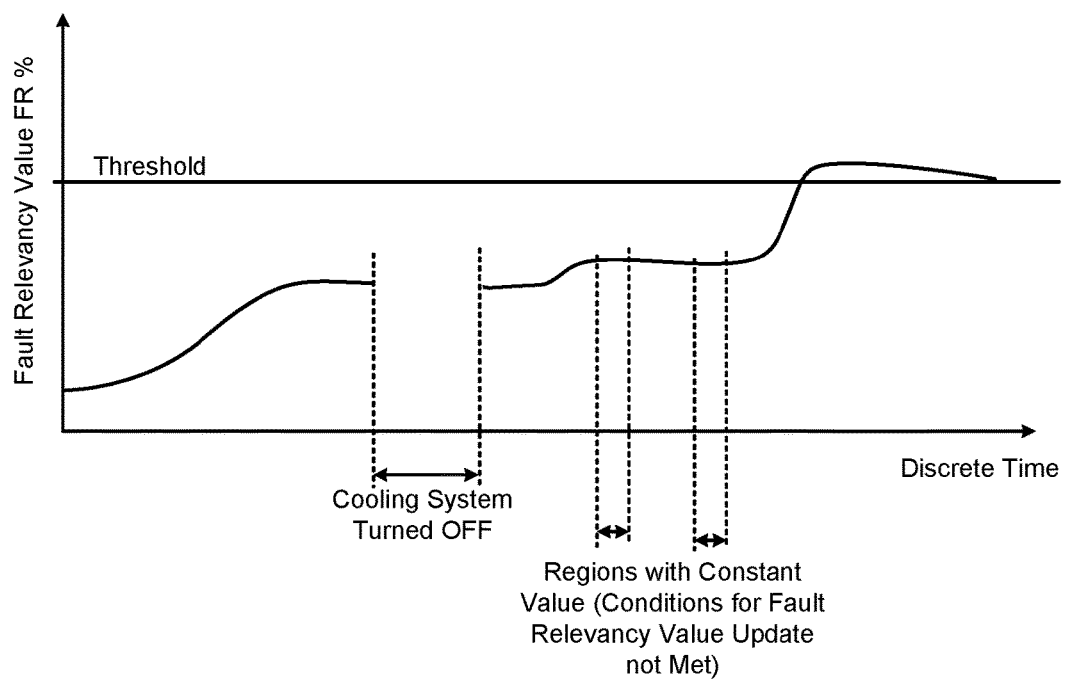
FIG. 11 is a plot illustrating fault relevancy values over time in accordance with an aspect of the present disclosure.

FIG. 11 shows an example illustration of when the fault relevancy value FR has increased and exceeded the threshold AMTHR. FIG. 11 also provides an example of when the cooling system 100 is turned OFF in which case the fault relevancy value FR remains unchanged.

The above-described tasks of FIGS. 4, 6 and 9 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The alarm threshold module 454 may adjust the threshold ALMTHR by executing a predetermined routine. This routine may only be applied for dual circuit cooling systems. When the fault relevancy value FR reaches a predetermined amount (e.g., 2%) below the threshold ALMTHR, a threshold setting evaluation/auto-adjustment may be performed. For example, if the ALMTHR is set at 67%, the threshold setting evaluation/auto-adjustment takes place once the fault relevancy value FR reaches 65%. The threshold setting evaluation is based on a comparison of the totals detm1 and detm2. If the criterion (or criteria) in Table 8 is satisfied, the threshold value ALMTHR is automatically suppressed and new value of 90% may be used instead.

TABLE 8

Criteria for the threshold auto-adjustment

| Description | Note |
|---|---|
| If detm1/(detm1 + detm2) >= 0.9 or detm1/(detm1 + detm2) <= 0.1, then criteria satisfied. | Criteria includes logical OR condition |

The triggered event may be reset by a user. The triggered event may alternatively be automatically reset by generation of the RESET parameter (or signal). The resetting (or reset event) includes setting the fault relevancy value FR back to an initial value of 0%. The reset event also includes returning the threshold ALMTHR back to an original setting if the threshold ALMTHR had been previously adjusted by the threshold adjustment routine. The totals detm1 and detm2 may also be reset to zero. All of the values stored in the BINtable and the second count CNTm2 may remain unchanged during the reset event. The fault relevancy values for each cooling circuit may be reset at any time from a service menu on a display of the cooling system 100 by an authorized user. The service menu may also be accessed to clear historical values stored in the BINtable and the value of the second count CNTm2. The clearing of historical values may be performed if refrigerant has been added to one of the cooling circuits.

Figure 12:
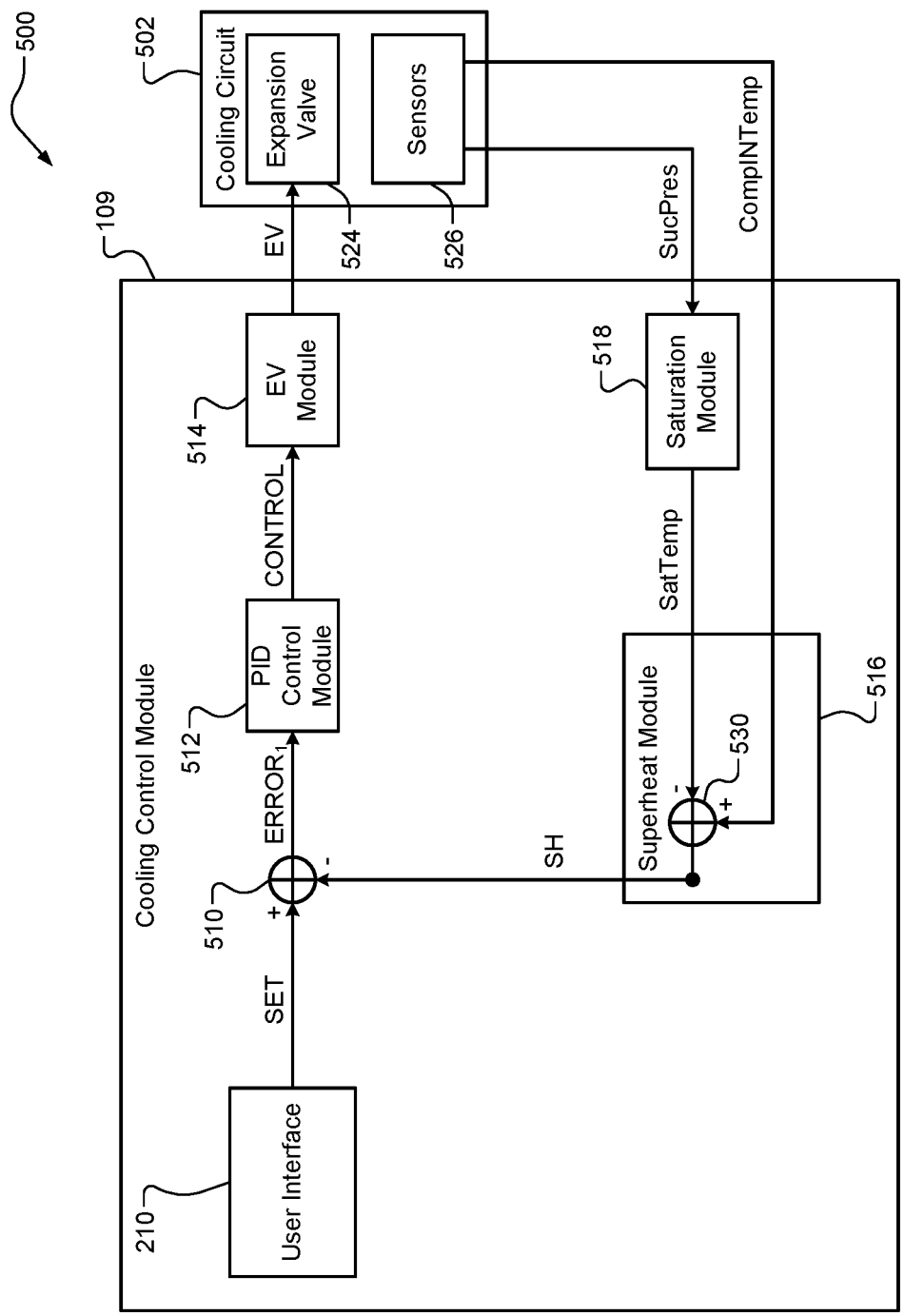
FIG. 12 is a functional block diagram of a superheat regulation system in accordance with an aspect of the present disclosure.

FIG. 12 shows an example of a superheat setpoint regulation system 500. FIG. 12 provides an example of how the above-described superheat values SH1, SH2 may be set. The superheat setpoint regulation system 500 includes the cooling control module 109 and a cooling circuit 502 (e.g., one of the cooling circuits 104, 108 of FIG. 2). The cooling control module 109 includes the user interface 210, a summer 510, a PID control module 512, an expansion valve (EV) module 514, a superheat module 516 and a saturation module 518. The superheat module 516 generates a superheat signal SH, which indicates a superheat value. The superheat value indicates a superheat condition of a compressor (e.g., one of the compressors 116, 118, 126, 128) of the cooling circuit 502.

The summer 510 subtracts the superheat signal SH from the superheat setpoint SET to generate an error signal $ERROR_1$. The PID control module 512 provides PID control of a position of an EV 524 (e.g., one of the EVs 112, 122) of the cooling circuit 502. The PID control module 512 generates a control signal CONTROL to control the position of the EV 524 based on the error signal $ERROR_1$. The PID control module 512 may have tuning parameters such as PID gains, which may be used to determine PID values for EV control. The EV module 514 generates an EV signal to adjust the position of the EV 524 based on the control signal CONTROL.

The superheat module 516 receives sensor signals from sensors 526 (e.g., sensors 152, 154, 160, 162) of the cooling circuit 502 and/or a saturation temperature SatTemp from the saturation module 518. The sensor signals may include a suction pressure signal SucPres and compressor inlet temperature signal CompINTemp. The saturation module 518 determines the saturation temperature SatTemp of the compressor based on the suction pressure signal SucPres. The superheat module 516 may include a second summer 530, which may subtract the saturation temperature SatTemp from the compressor inlet temperature CompINTemp to generate the superheat signal SH.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A method comprising: determining a cooling system, configured to operate in each of a compressor mode, a reheat mode, a humidification mode, a dehumidification mode and a pump refrigerant economization mode, is operating in a cooling mode, such that the cooling system is not operating in the reheat mode, the humidification mode or the dehumidification mode; determining the cooling system is operating in the compressor mode, such that the cooling system is not operating in the pump refrigerant economization mode; determining the cooling system is at steady-state; in response to the cooling system being operated in the cooling mode and the compressor mode and being at steady-state, performing an evaluation process including evaluating one or more first rules to determine if a degradation symptom exists for the cooling system, wherein the one or more first rules are associated with the cooling system including a single cooling circuit, evaluating one or more conditions, wherein the one or more conditions are associated with the cooling system including dual cooling circuits, and determining if the one or more conditions are satisfied and, as a result of the one or more conditions being satisfied, evaluating one or more second rules to determine if a degradation symptom exists for the cooling system; subsequent to performing the evaluation process, generating a degradation evaluation value to indicate whether the one or more first rules are satisfied or the one or more second rules are satisfied; and based on the degradation evaluation value, generating an alarm signal or performing a countermeasure.

2. The method of claim 1, wherein the evaluating of the one or more first rules includes determining whether (i) an open percentage of an expansion valve is greater than or equal to a first predetermined value, and (ii) a superheat temperature is greater than or equal to a product of a coefficient and a superheat setpoint.

3. The method of claim 2, wherein the determining of whether the one or more first rules are satisfied includes determining whether a call for cooling percentage is less than a second predetermined value.

4. The method of claim 2, wherein the determining of whether the one or more first rules are satisfied includes determining whether a condenser pressure is less than a condenser pressure setpoint.

5. The method of claim 1, wherein:
the determining of whether the one or more second rules are satisfied includes determining
whether an open percentage of a first expansion valve of a first cooling circuit is greater than or equal to a maximum of (i) a product of an open percentage of a second expansion valve of a second cooling circuit and a first constant, and (ii) a sum of the open percentage of the second expansion valve and a second constant, or
whether the open percentage of the second expansion valve is greater than a maximum of (i) a product of the open percentage of the first expansion valve and a third constant, and (ii) a sum of the open percentage of the first expansion valve and a fourth constant; and
the first constant, the second constant, the third constant and the fourth constant are different values and are greater than zero and not equal to one.

6. The method of claim 5, wherein the open percentage of the first expansion valve and the open percentage of the second expansion valve are greater than zero.

7. The method of claim 1, wherein:
the determining of whether the one or more second rules are satisfied includes determining
whether an open percentage of a first expansion valve of a first cooling circuit is greater than or equal to a maximum of (i) a product of an open percentage of a second expansion valve of a second cooling circuit and a first constant, and (ii) a sum of the open percentage of the second expansion valve and a second constant, and
whether the open percentage of the second expansion valve is greater than a maximum of (i) a product of the open percentage of the first expansion valve and a third constant, and (ii) a sum of the open percentage of the first expansion valve and a fourth constant; and
the first constant, the second constant, the third constant and the fourth constant are different values and are greater than zero and not equal to one.

8. The method of claim 7, wherein the open percentage of the first expansion valve and the open percentage of the second expansion valve are greater than zero.

9. The method of claim 1, further comprising:
iteratively evaluating the one or more first rules to determine if a degradation symptom exists for the cooling system;
subsequent to each of the iteratively performed evaluations, generating a respective degradation evaluation value to indicate whether the one or more first rules are satisfied;
incrementing a counter for each of the degradation evaluation values indicating that the one or more first rules are satisfied; and
determining that a value of the counter is greater than or equal to a predetermined threshold and generating the alarm signal or performing the countermeasure as a result of the value of the counter being greater than or equal to the predetermined threshold.

10. The method of claim 9, wherein the one or more first rules are for a single parameter.

11. The method of claim 9, wherein the one or more first rules are for multiple parameters.

12. The method of claim 1, further comprising controlling one or more cooling circuits based on the degradation evaluation value, wherein each of the one or more cooling circuits includes a respective compressor, condenser, expansion valve, and evaporator.

13. The method of claim 1, further comprising adjusting a fault relevancy value based on the degradation evaluation value, wherein the alarm signal is generated or the countermeasure is performed if the fault relevancy value reaches a predetermined threshold.

14. The method of claim 1, wherein the dual cooling circuits include:
a first cooling circuit including a first compressor, a first evaporator, a first condenser, a first expansion valve; and
a second cooling circuit including a second compressor, a second evaporator, a second condenser, a second expansion valve.

15. The method of claim 1, further comprising:
iteratively evaluating the one or more second rules to determine if a degradation symptom exists for the cooling system;
subsequent to each of the iteratively performed evaluations, generating a respective degradation evaluation value to indicate whether the one or more second rules are satisfied;
incrementing a counter for each of the degradation evaluation values indicating that the one or more second rules are satisfied; and
determining a value of the counter is greater than or equal to a predetermined threshold and generating the alarm signal or performing the countermeasure as a result of the value of the counter being greater than or equal to the predetermined threshold.

16. The method of claim 1, wherein:
the first rules include
a rule 1 for determining whether an open percentage of an expansion valve is greater than or equal to a first predetermined value and a superheat temperature is greater than or equal to a superheat setpoint and either a condenser pressure is less than a product of a second predetermined value and the superheat setpoint or a call for cooling percentage is less than or equal to a predetermined percentage,
a rule 2 for determining whether the open percentage of the expansion valve is greater than or equal to the first predetermined value and the superheat temperature is greater than or equal to the superheat setpoint and the condenser pressure is less than a product of the second predetermined value and a condenser setpoint, and
a rule 3 for determining whether the open percentage of the expansion valve is greater than or equal to the first predetermined value and the superheat temperature is greater than or equal to the superheat setpoint and the call for cooling percentage is less than or equal to the predetermined percentage; and
the first predetermined value, the second predetermined value, the superheat setpoint, the predetermined percentage and the condenser setpoint are greater than zero and not equal to one.

17. The method of claim 1, wherein:
the second rules include
a rule 1 for determining whether an open percentage of a first expansion valve of a first cooling circuit minus an open percentage of a second expansion valve of a second cooling circuit is greater than or equal to a first predetermined percentage,
a rule 2 for determining whether first conditions exist or a second condition exists,
the first conditions include
the open percentage of the second expansion valve is greater than or equal to a first predetermined value,
a superheat temperature of the second cooling circuit is greater than or equal to a product of a second predetermined value and a superheat setpoint, and
a call for cooling percentage is less than a second predetermined percentage, and
the second condition includes the superheat temperature of the second cooling circuit minus a superheat temperature of the first cooling circuit is greater than a third predetermined value;
a rule 3 for determining whether the open percentage of the first expansion valve is greater than a maximum of (i) a product of the open percentage of the second expansion valve and a fourth predetermined value, and (ii) a sum of the open percentage of the second expansion valve and a third predetermined percentage;
a rule 4 of determining whether the open percentage of the second expansion valve is greater than a maximum of (i) a product of the open percentage of the first expansion valve and a fifth predetermined value, and (ii) a sum of the open percentage of the first expansion valve and a fourth predetermined percentage; and
the first predetermined value, the second predetermined value, the third predetermined value, the fourth predetermined value, the fifth predetermined value, the first predetermined percentage, the second predetermined percentage, the third predetermined percentage and the fourth predetermined percentage are greater than zero and not equal to one.

18. A method comprising: determining a cooling system configured to operate in each of a compressor mode, a reheat mode, a humidification mode, a dehumidification mode and a pump refrigerant economization mode, is operating in a cooling mode, such that the cooling system is not operating in the reheat mode, the humidification mode or the dehumidification mode; determining the cooling system is operating in the compressor mode, such that the cooling system is not operating in the pump refrigerant economization mode; determining a plurality of parameters are in a predefined operational space; determining the cooling system is at steady-state; determining an average of qualified values of a first parameter of the cooling system as a result of (i) the plurality of parameters being in the predefined operational space, and (ii) the cooling system operating in the cooling mode and the compressor mode and being at steady-state, wherein the plurality of parameters do not include the first parameter; based on the average of qualified values, determining whether a predefined criterion is satisfied for a degradation symptom of the cooling system; generating a degradation evaluation value to indicate whether the predefined criterion is satisfied; and based on the degradation evaluation value, generating an alarm signal or performing a countermeasure.

19. The method of claim 18, further comprising:
iteratively determining the average of qualified values;
incrementing a counter subsequent to each of the iterative determinations of the average of qualified values;
determining if a value of the counter is greater than or equal to a predetermined threshold;
generating the degradation evaluation value if the value of the counter is greater than or equal to the predetermined threshold; and
refraining from generating the degradation evaluation value if the value of the counter is less than the predetermined threshold.

20. The method of claim 19, further comprising, if the counter is greater than or equal to the predetermined threshold:
increasing a bin threshold; and
increasing the value of the counter,
wherein the determining of whether the predefined criterion is satisfied includes determining whether the first parameter is greater than a maximum of (i) a product of the bin threshold and an average of previously qualified versions of the first parameter, and (ii) a sum of a constant and the average of qualified values of the first parameter.

21. The method of claim 20, wherein:
the plurality of parameters include a compressor loading percentage and a compressor pressure differential; and
the first parameter is an open percentage of a first expansion valve of a first cooling circuit or an open percentage of a second expansion valve of a second cooling circuit.

22. The method of claim 18, further comprising:
iteratively determining an average deviation associated with the first parameter;
incrementing a counter subsequent to each of the iterative determinations of the average deviation;
determining if a value of the counter is greater than or equal to a predetermined threshold
generating the degradation evaluation value if the value of the counter is greater than or equal to the predetermined threshold; and
refraining from generating the degradation evaluation value if the value of the counter is less than the predetermined threshold.

23. The method of claim 22, further comprising, if the counter is greater than or equal to the predetermined threshold:
increasing a bin threshold; and
increasing the value of the counter,
wherein the determining of whether the predefined criterion is satisfied includes determining whether the first parameter is greater than a maximum of (i) a product of the bin threshold and an average of previously measured versions of the first parameter, and (ii) a sum of a constant and the average of qualified values of the first parameter.

24. The method of claim 18, further comprising:
iteratively evaluating the criterion to determine if the degradation symptom exists for the cooling system;
subsequent to each of the iteratively performed evaluations, generating a respective degradation evaluation value to indicate whether the criterion is satisfied;
incrementing a counter for each of the degradation evaluation values indicating that the criterion is satisfied; and
determining a value of the counter is greater than or equal to a predetermined threshold and generating the alarm signal or performing the countermeasure as a result of the value of the counter being greater than or equal to the predetermined threshold.

25. The method of claim 18, further comprising controlling one or more cooling circuits based on the degradation evaluation value, wherein each of the one or more cooling circuits includes a respective compressor, condenser, expansion valve, and evaporator.

26. The method of claim 18, further comprising:
the average of qualified values is iteratively determined and includes combining and averaging a currently collected qualified value with historically collected qualified values;
each of the qualified values refers to a parameter that satisfies a rule while a plurality of predetermined conditions exist;
incrementing a bin counter each time one of the qualified values is determined to be qualified; and
determining the bin counter has exceeded a predetermined number,
wherein the predefined criterion is determined to be satisfied as a result of the determining that the bin counter has exceeded the predetermined number.

* * * * *